(12) United States Patent
Ranka et al.

(10) Patent No.: US 11,735,142 B2
(45) Date of Patent: Aug. 22, 2023

(54) SYNCHRONIZATION TECHNIQUES IN SPLIT RENDERING

(71) Applicant: QUALCOMM Incorporated, San Diego, CA (US)

(72) Inventors: Abhishek Ranka, Bangalore (IN); Arpit Bhatnagar, Bengaluru (IN); Mohammed Mohsin Hussain, Noida (IN); Karthik M V, Mysore (IN); Vinay Melkote Krishnaprasad, Bangalore (IN); Qi Xue, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 17/645,301

(22) Filed: Dec. 20, 2021

(65) Prior Publication Data
US 2023/0197037 A1   Jun. 22, 2023

(51) Int. Cl.
*G09G 5/12* (2006.01)
*G06F 3/01* (2006.01)

(52) U.S. Cl.
CPC ............... *G09G 5/12* (2013.01); *G06F 3/012* (2013.01); *G09G 2360/18* (2013.01); *G09G 2370/022* (2013.01)

(58) Field of Classification Search
CPC ................ G09G 5/12; G09G 2360/18; G09G 2370/022; G06F 3/012
See application file for complete search history.

(56) References Cited

U.S. PATENT DOCUMENTS

| 2021/0185334 A1* | 6/2021 | Mironov | H04N 19/436 |
| 2022/0264463 A1* | 8/2022 | Li | H04W 24/04 |

* cited by examiner

*Primary Examiner* — Xin Sheng
(74) *Attorney, Agent, or Firm* — Procopio, Cory, Hargreaves & Savitch LLP

(57) ABSTRACT

Aspects presented herein relate to methods and devices for graphics processing including an apparatus, e.g., client device or a server. The apparatus may transmit, to a server at a beginning of a first time period, at least one first head pose associated with a position of the client device, the first time period being synchronized with the server. The apparatus may also receive, from the server during a second time period, at least one first frame including first content based on the at least one first head pose, the second time period being synchronized with the server. Further, the apparatus may display, upon receiving the at least one frame during the second time period, the at least one first frame including the first content.

28 Claims, 23 Drawing Sheets

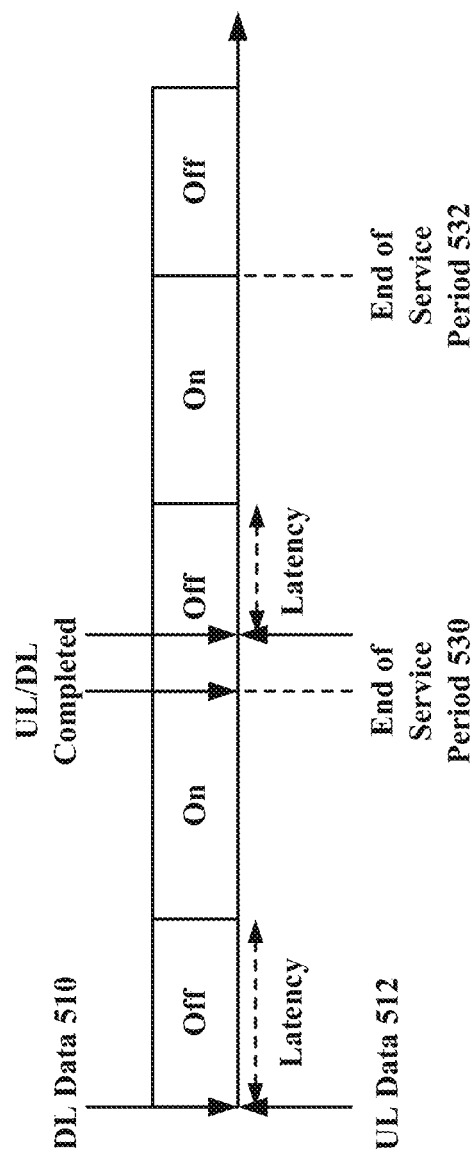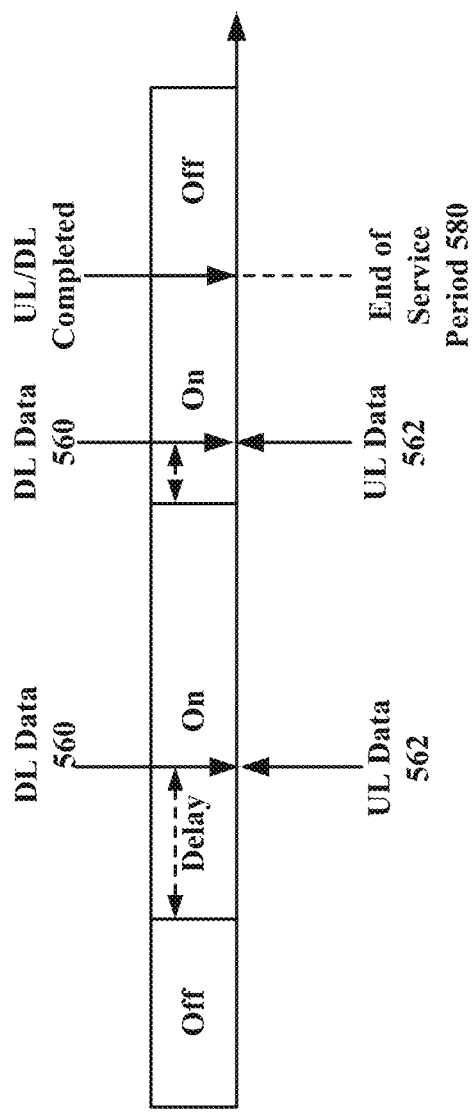

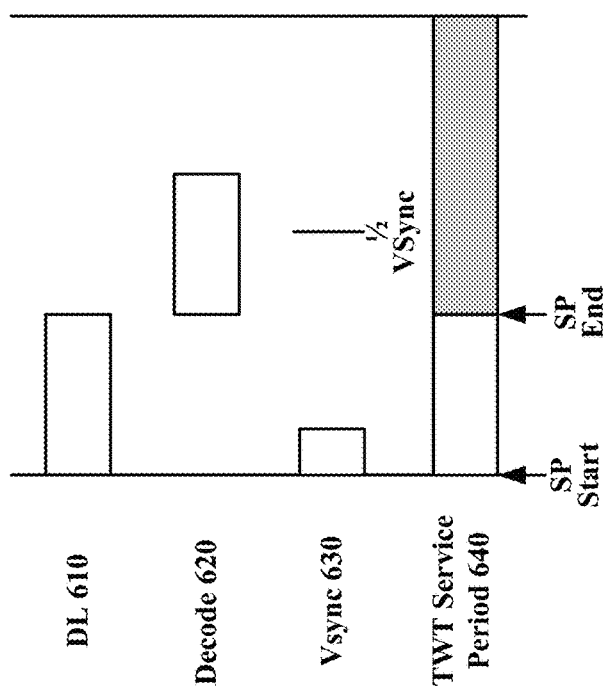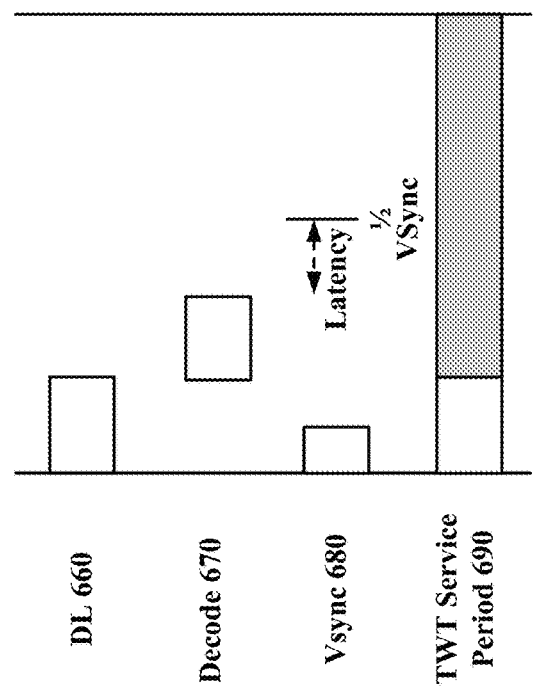

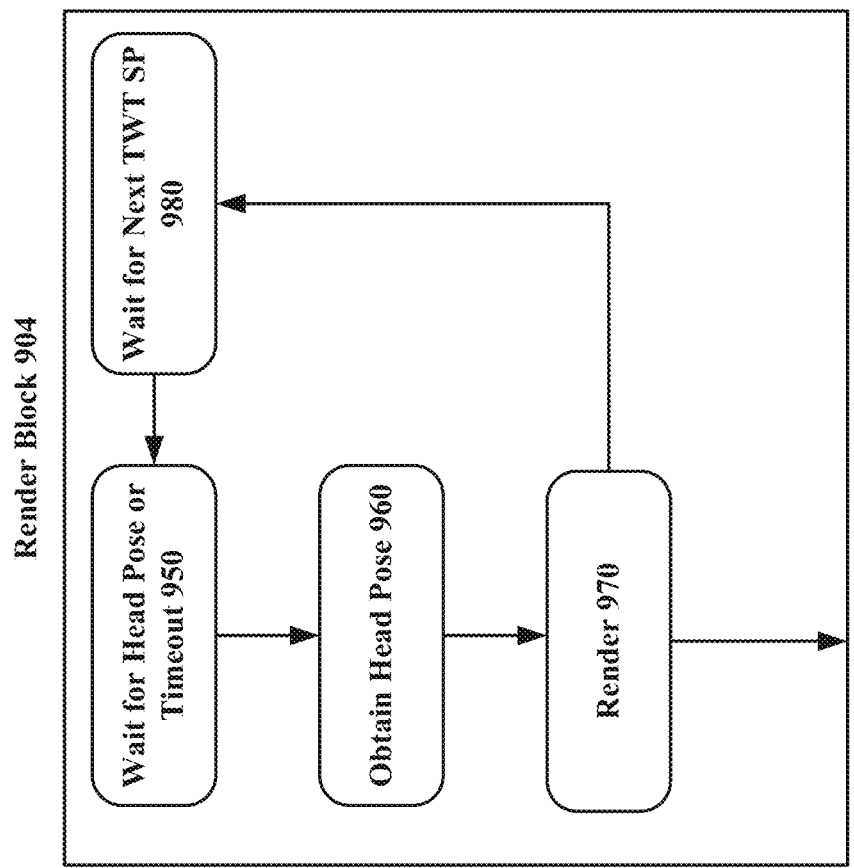
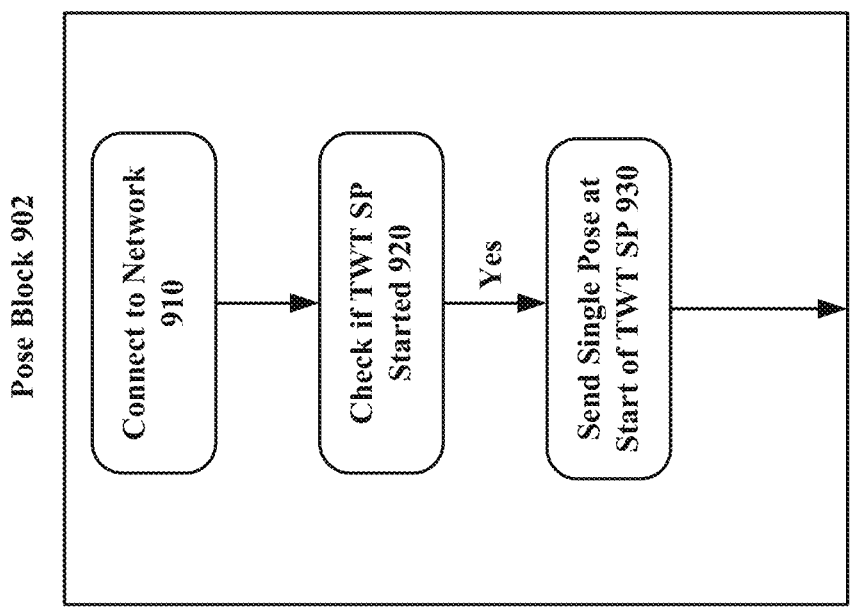
FIG. 9

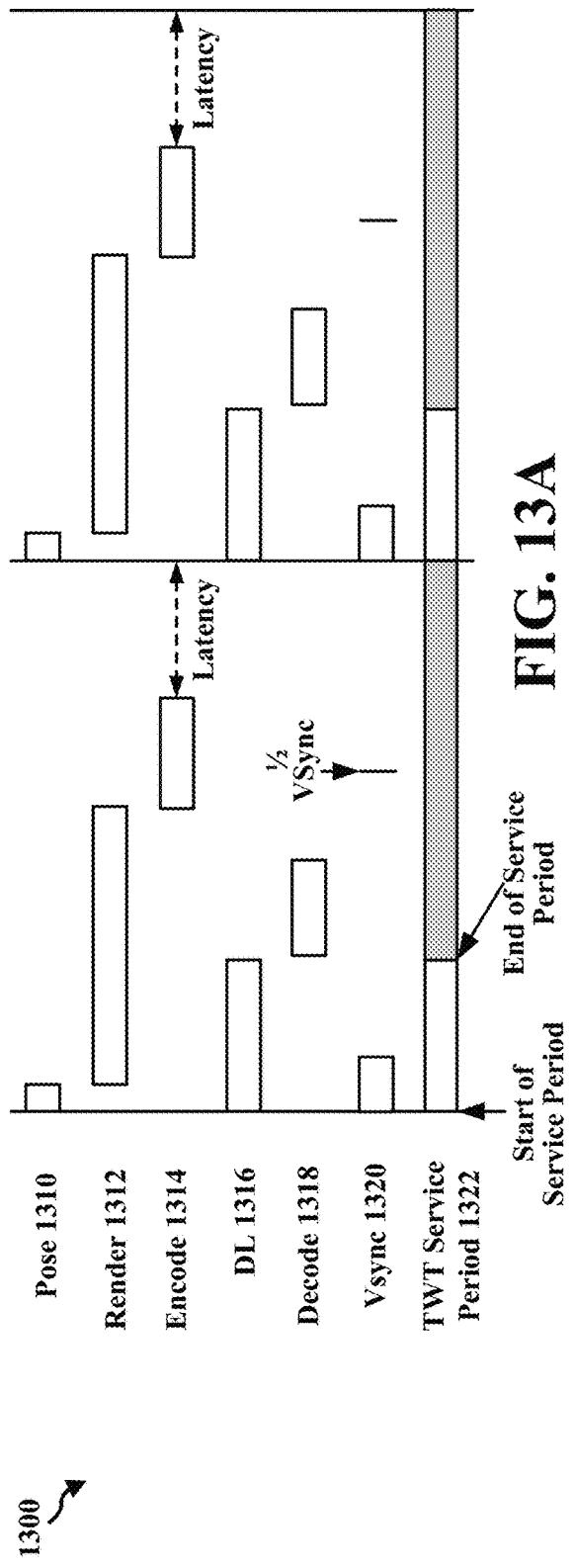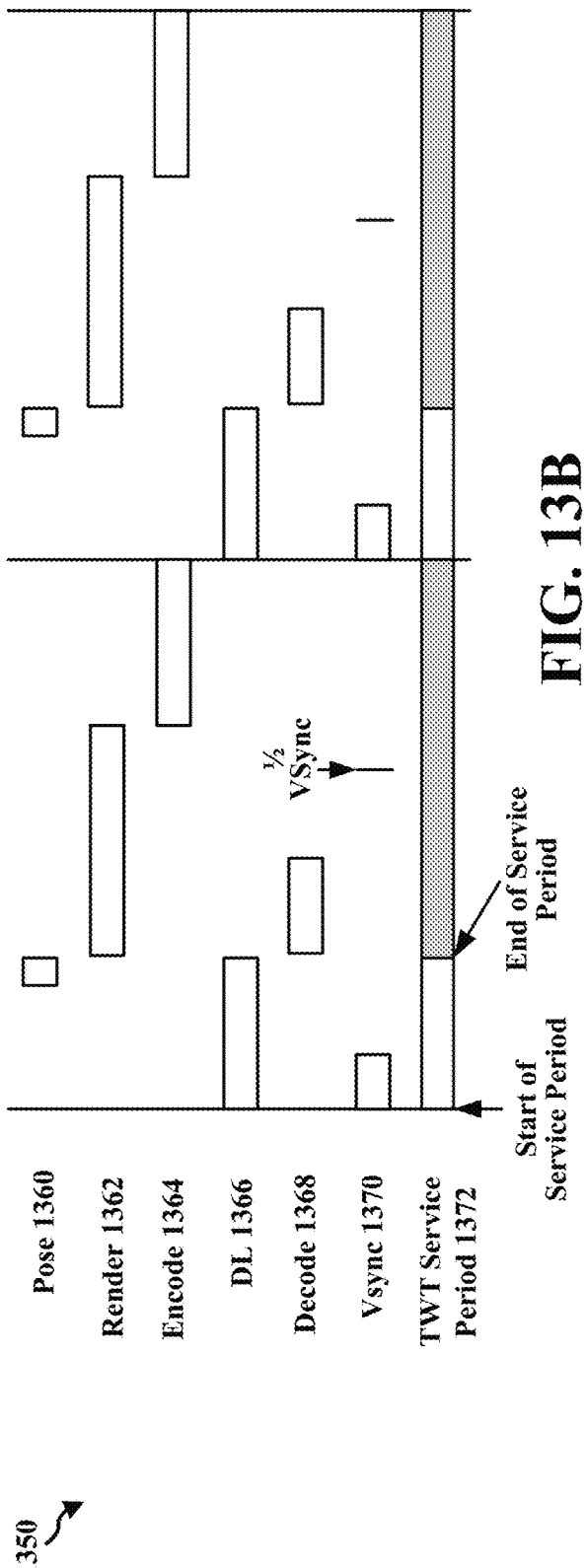

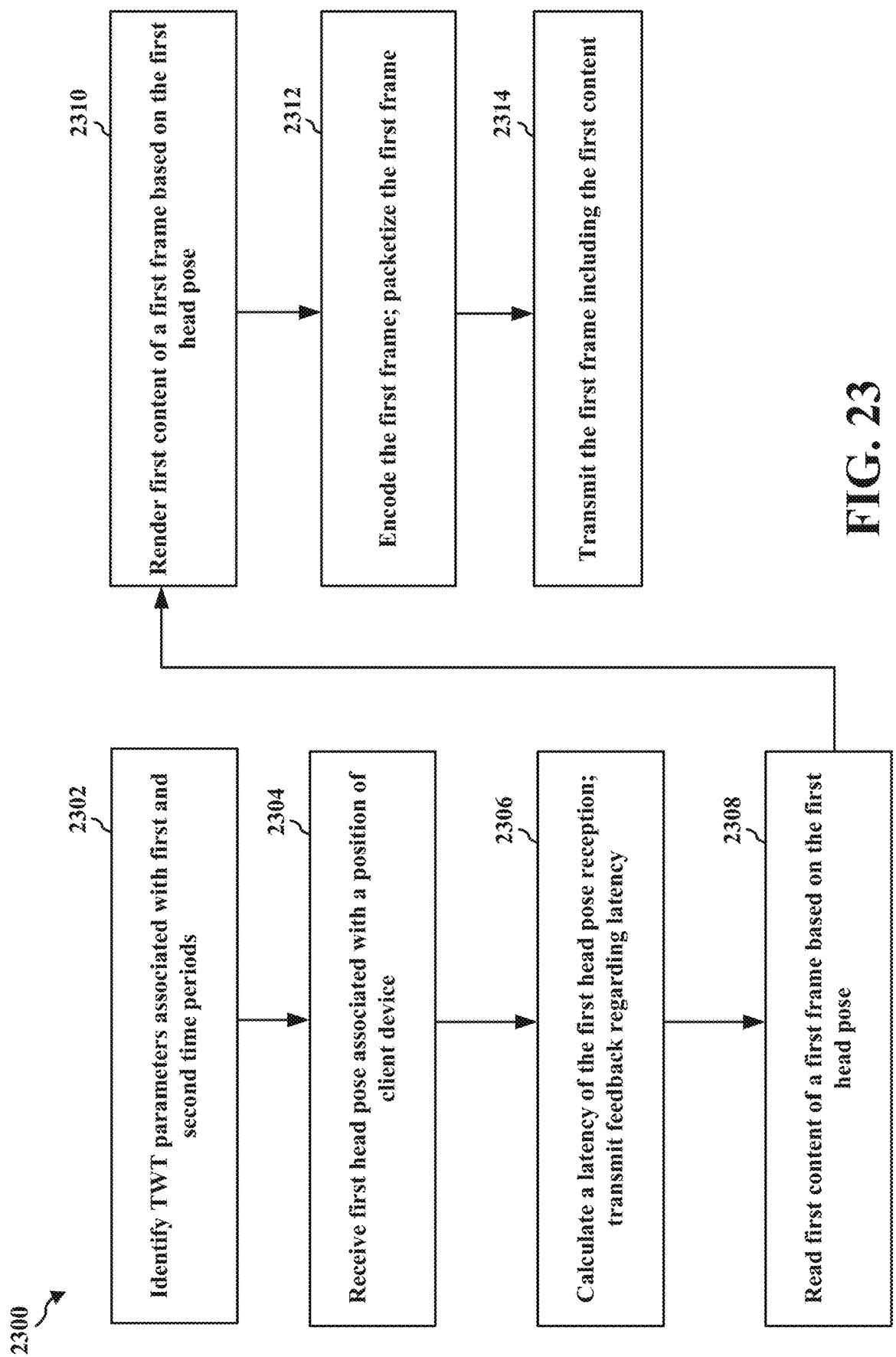

SYNCHRONIZATION TECHNIQUES IN SPLIT RENDERING

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a client device or any apparatus that may perform graphics processing. The apparatus may calculate, prior to a calculation of the one or more target wake time (TWT) parameters, at least one of: a subsequent vertical synchronization (VSync) time, a decode time period, or a frame downlink (DL) time. The apparatus may also calculate one or more target wake time (TWT) parameters associated with a first time period and a second time period. The apparatus may also initialize a TWT synchronization with a server based on the calculated one or more TWT parameters. Additionally, the apparatus may transmit, to a server at a beginning of a first time period, at least one first head pose associated with a position of the client device, the first time period being synchronized with the server. The apparatus may also receive, from the server, feedback regarding a latency associated with the transmission of the at least one first head pose. The apparatus may also adjust a transmission schedule of at least one subsequent head pose based on the received feedback. Moreover, the apparatus may receive, from the server during a second time period, at least one first frame including first content based on the at least one first head pose, the second time period being synchronized with the server. The apparatus may also de-packetize, upon receiving the at least one first frame, the at least one first frame including the first content. The apparatus may also decode, upon de-packetizing the at least one first frame, the at least one first frame including the first content, where the at least one first frame is de-packetized and decoded during the second time period. The apparatus may also display, upon receiving the at least one frame during the second time period, the at least one first frame including the first content.

In an aspect of the disclosure, a method, a computer-readable medium, and an apparatus are provided. The apparatus may be a server or any apparatus that may perform graphics processing. The apparatus may identify one or more target wake time (TWT) parameters associated with a first time period and a second time period. The apparatus may also receive, from a client device during a first time period, at least one first head pose associated with a position of the client device, the first time period being synchronized with the client device. The apparatus may also calculate a latency associated with the reception of the at least one first head pose. Also, the apparatus may transmit, to the client device, feedback regarding the latency associated with the reception of the at least one first head pose. The apparatus may also read, upon receiving the first head pose, the first content of the first frame based on the first head pose, where the first content is rendered based on the read first content. The apparatus may also render, during the first time period, first content of at least one first frame based on the first head pose. Further, the apparatus may encode, upon rendering the first content of the at least one first frame, the at least one first frame including the first content. The apparatus may also packetize, upon encoding the at least one first frame, the at least one first frame including the first content, where the at least one first frame is encoded and packetized prior to the beginning of the second time period. The apparatus may also transmit, to the client device at a beginning of a second time period, the at least one first frame including the first content, the second time period being synchronized with the client device.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 5A is a diagram illustrating an example timeline of a split rendering process.

FIG. 5B is a diagram illustrating an example timeline of a split rendering process.

FIG. 6A is a diagram illustrating an example timeline of a split rendering process.

FIG. 6B is a diagram illustrating an example timeline of a split rendering process.

FIG. 9 is a diagram illustrating an example split rendering process.

FIG. 13A is a diagram illustrating an example timeline of a split rendering process.

FIG. 13B is a diagram illustrating an example timeline of a split rendering process.

FIG. 23 is a flowchart of an example method of graphics processing.

DETAILED DESCRIPTION

Figure 1:
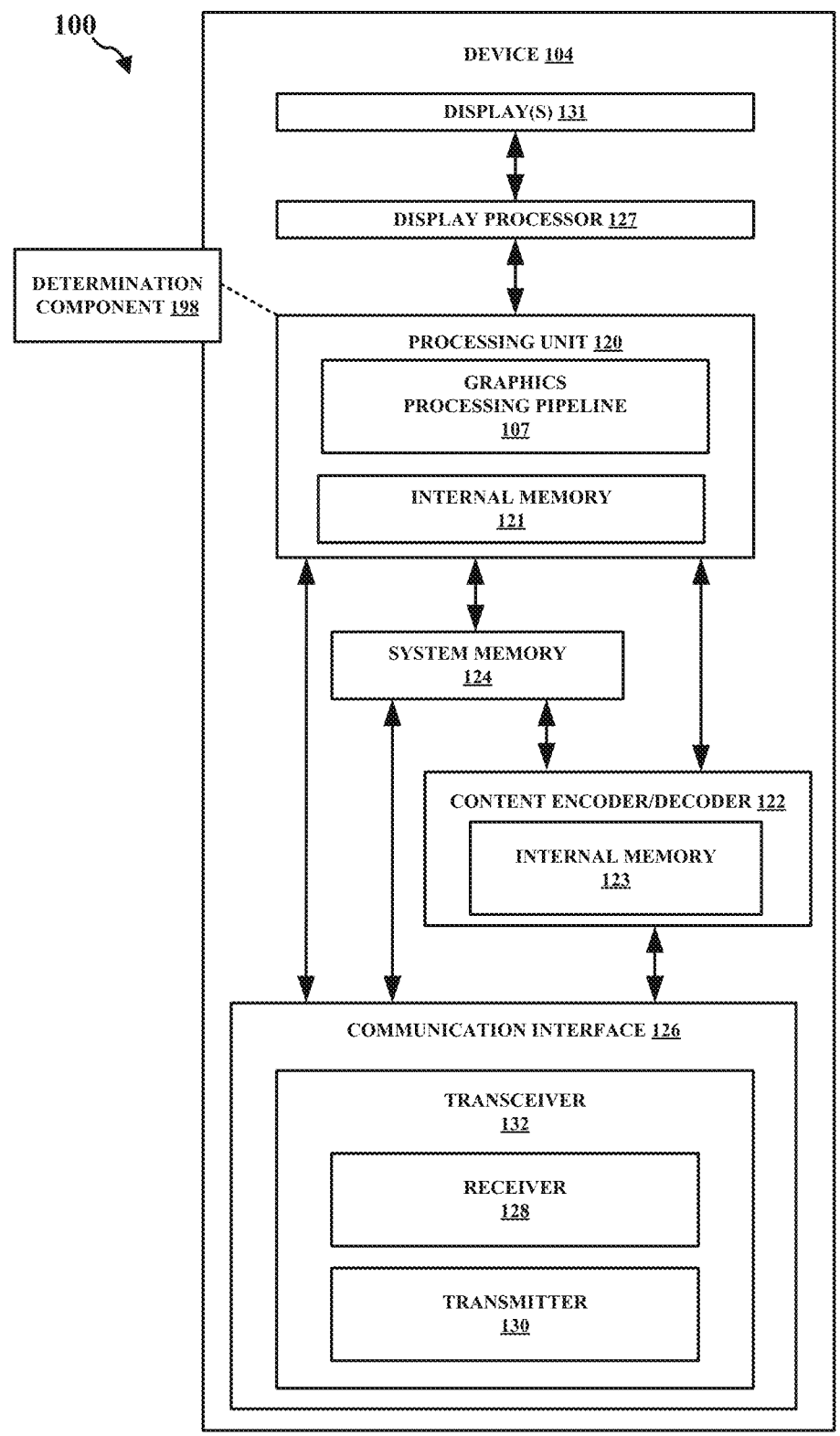
FIG. 1 is a block diagram that illustrates an example content generation system.

In split rendering applications, content may be rendered on servers and encoded/streamed to headsets over Wi-Fi. Split rendering means the workload may be split between two devices, i.e., the host/server and the client/headset. For example, one use case is a smartphone connected to a headset/glasses. Glasses may not have high processing capabilities, and heat dissipation may be an issue if all the processing is performed on the client/glasses. Accordingly, it is beneficial to split the rendering between the server and the client device. Some aspects of split rendering may utilize a number of different features, such as a target wake time (TWT) and a timing synchronization function (TSF). The TWT feature may allow a modem/radio frequency (RF) to be to switched on at a fixed cadence and for a known service period. This TWT feature may be utilized to save power on the server and the client device. While TWT may ensure a power reduction on the modem side, the selection of TWT parameters may influence XR performance, such as the latency and frame reuse (i.e., judder). In some instances, the TWT feature may allow UL (pose) data and downlink (rendered+encoded) frame data to be aligned with a TWT service period (On Period), i.e., the transmission (Tx) and reception (Rx) on the client device and the server may happen simultaneously. When data is transmitted simultaneously within the same service period, it may provide the modem a chance to sleep for a certain time, which may reduce power and thermal issues. In some Wi-Fi scenarios, each station (STA) may have a timer synchronized with a timing synchronized function (TSF), e.g., associated with a service access point (SAP). Additionally, early termination may allow a service period to be terminated early on detection of inactivity of downlink/uplink data. Early termination processes may include an end of service period (EOSP). For example, the ESOP may terminate a service interval (i.e., transition the service interval from an "on" period to an "off" period). Wi-Fi TWT may allow a modem to turn on and off at a defined cadence. TWT may also support early termination, such as if data is not present for transmission for a defined time period, the modem may turn off. In some aspects of split rendering, wireless clients/glasses may utilize certain types of designs (e.g., sleek and/or light weight designs), which may pose battery consumption and thermal dissipation challenges. For example, one of the contributors of power consumption on AR glasses may be wireless transmission. Power savings may be realized by traffic shaping the uplink and downlink transmissions between the server/phone and the client/glasses, but this may result in higher latency and visual quality issues if the synchronization with real-time XR processing is not performed. Aspects of the present disclosure may utilize split rendering synchronization at the split rendering framework level, such as for certain types of schemes (e.g., Wi-Fi TWT). Additionally, aspects presented herein may utilize split rendering synchronization including power and thermal optimizations. Aspects presented herein may also utilize improved visual quality close to a display timeline, which may reduce the amount of duplicate displays. Moreover, for split rendering processes, aspects of the present disclosure may utilize techniques in XR applications to achieve synchronization to work with optimized transmission schemes, e.g., Wi-Fi TWT.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a determination component 198 configured to calculate, prior to a calculation of the one or more target wake time (TWT) parameters, at least one of: a subsequent vertical synchronization (VSync) time, a decode time period, or a frame downlink (DL) time. The determination component 198 may also be configured to calculate one or more target wake time (TWT) parameters associated with a first time period and a second time period. The determination component 198 may also be configured to initialize a TWT synchronization with a server based on the calculated one or more TWT parameters. The determination component 198 may also be configured to transmit, to a server at a beginning of a first time period, at least one first head pose associated with a position of the client device, the first time period being synchronized with the server. The determination component 198 may also be configured to receive, from the server, feedback regarding a latency associated with the transmission of the at least one first head pose. The determination component 198 may also be configured to adjust a transmission schedule of at least one subsequent head pose based on the received feedback. The determination component 198 may also be configured to receive, from the server during a second time period, at least one first frame including first content based on the at least one first head pose, the second time period being synchronized with the server. The determination component 198 may also be configured to de-packetize, upon receiving the at least one first frame, the at least one first frame including the first content. The determination component 198 may also be configured to decode, upon de-packetizing the at least one first frame, the at least one first frame including the first content, where the at least one first frame is de-packetized and decoded during the second time period. The determination component 198 may also be configured to display, upon receiving the at least one frame during the second time period, the at least one first frame including the first content.

Referring again to FIG. 1, in certain aspects, the processing unit 120 may include a determination component 198 configured to identify one or more target wake time (TWT) parameters associated with a first time period and a second time period. The determination component 198 may also be configured to receive, from a client device during a first time period, at least one first head pose associated with a position of the client device, the first time period being synchronized with the client device. The determination component 198 may also be configured to calculate a latency associated with the reception of the at least one first head pose. The determination component 198 may also be configured to transmit, to the client device, feedback regarding the latency associated with the reception of the at least one first head pose. The determination component 198 may also be configured to read, upon receiving the first head pose, the first content of the first frame based on the first head pose, where the first content is rendered based on the read first content. The determination component 198 may also be configured to render, during the first time period, first content of at least one first frame based on the first head pose. The determination component 198 may also be configured to encode, upon rendering the first content of the at least one first frame, the at least one first frame including the first content. The determination component 198 may also be configured to packetize, upon encoding the at least one first frame, the at least one first frame including the first content, where the at least one first frame is encoded and packetized prior to the beginning of the second time period. The determination component 198 may also be configured to transmit, to the client device at a beginning of a second time period, the at least one first frame including the first content, the second time period being synchronized with the client device. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
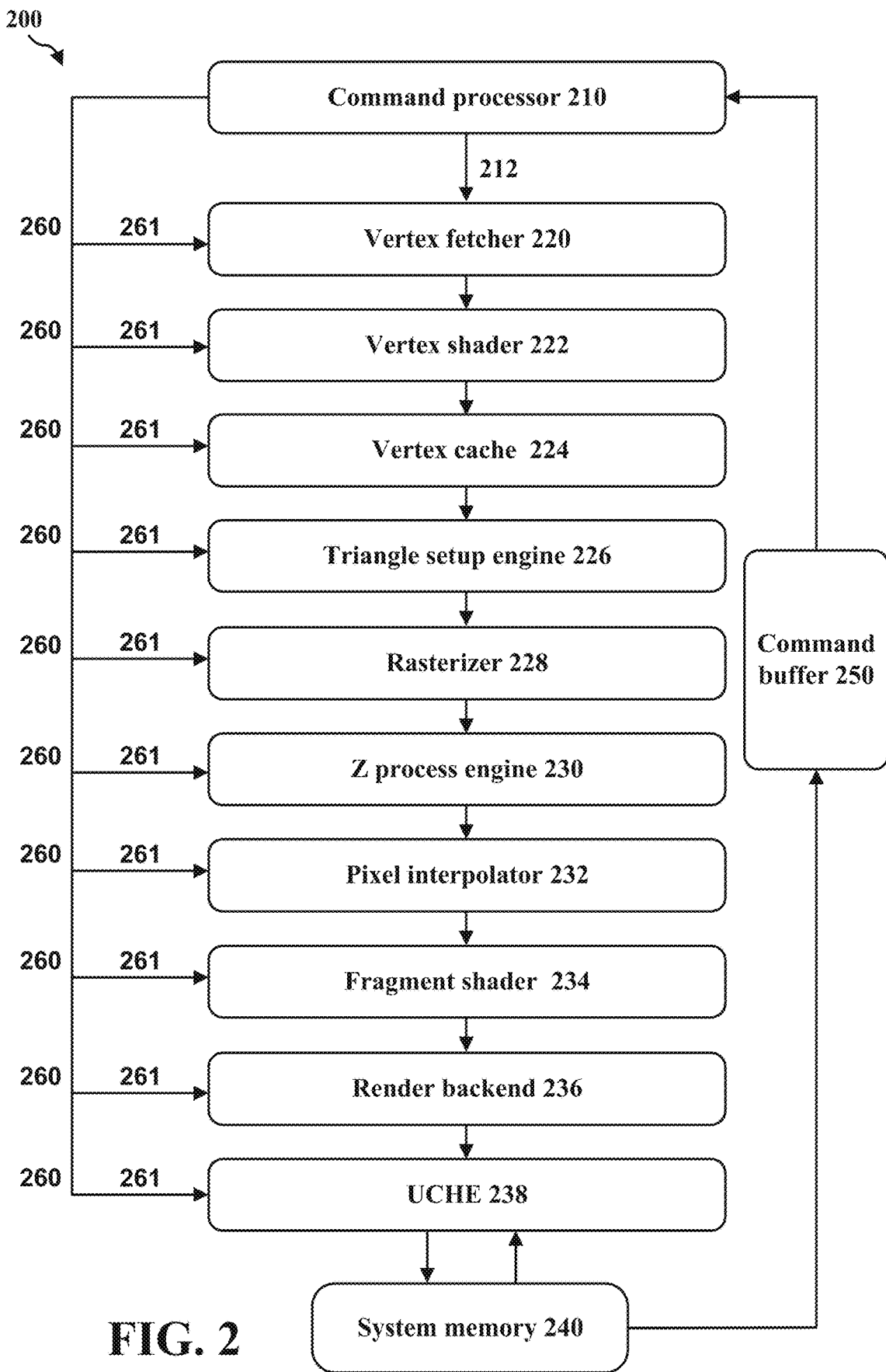
FIG. 2 is an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call data packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

In some aspects of graphics processing, the rendering of content may be performed in multiple locations and/or on multiple devices, e.g., in order to divide the rendering workload between different devices. For example, the rendering may be split between a server and a client device, which may be referred to as "split rendering." In some instances, split rendering may be a method for bringing content to client devices, where a portion of the graphics processing may be performed outside of the client device, e.g., at a server. In some aspects, the server may be at least one of: a phone, a smart phone, a computer, or a cloud server. Further, the client device may be at least one of: a headset, a head mounted display (HMD), display glasses, or smart glasses.

Split rendering may be performed for a number of different types of applications, e.g., virtual reality (VR) applications, augmented reality (AR) applications, and/or extended reality (XR) applications. In VR applications, the content displayed at the client device may correspond to man-made or animated content. In AR or XR content, a portion of the content displayed at the client device may correspond to real-world content, e.g., objects in the real world, and a portion of the content may be man-made or animated content. Also, the man-made or animated content and real-world content may be displayed in an optical see-through or a video see-through device, such that the user may view real-world objects and man-made or animated content simultaneously. In some aspects, man-made or animated content may be referred to as augmented content, or vice versa.

Split XR or AR systems may also introduce latency when delivering the rendered content to the client display. In some aspects, this latency may be even higher when rendering occurs on a server than compared to client rendering, but it can also enable more complex XR or AR applications. In addition, there may be non-negligible latency between the time a camera pose is computed and the time the content appears on the client display. For instance, a certain amount of latency may be present in split XR or AR systems.

Figure 3:
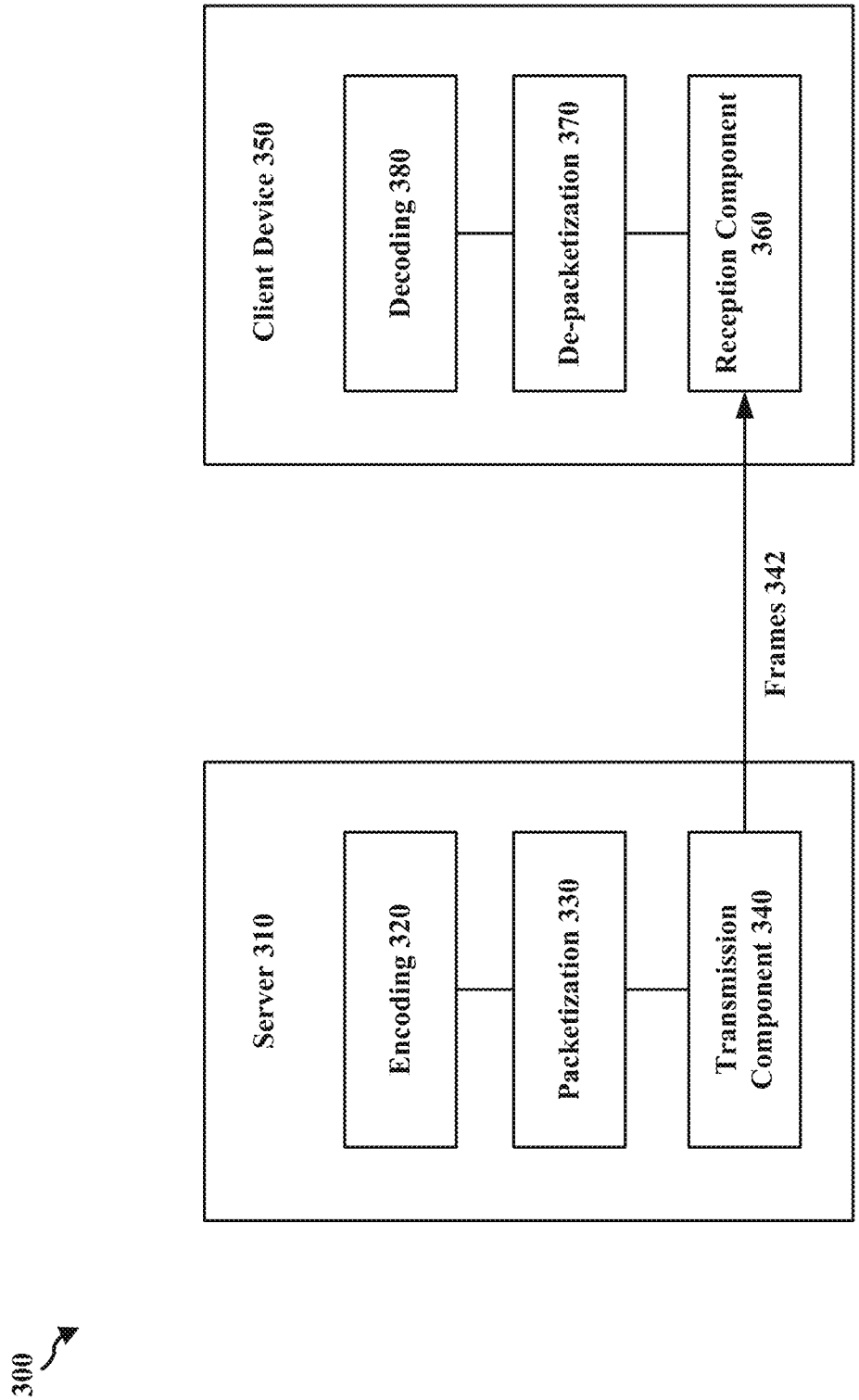
FIG. 3 is a diagram illustrating example communication of content/data in accordance with a split rendering process.

FIG. 3 illustrates diagram 300 including communication of content/data in accordance with a split rendering process. As shown in FIG. 3, diagram 300 includes server 310 and client device 350 associated with the split rendering process. FIG. 3 shows a number of processes that are performed at the server 310 and the client device 350 including an encoding process 320, a packetization process 330, a de-packetization process 370, and a decoding process 380. Server 310 and client device 350 also include a transmission component 340 and a reception component 360, respectively.

As shown in FIG. 3, on the server 310, data/content associated with images/frames may be encoded during encoding process 320. After encoding process 320, the data/content may then undergo a packetization process 330, e.g., a real-time transport protocol (RTP) packetization process. During the packetization process, the data/content may be converted to one or more frames 342. The frames 342 may then be transmitted from the transmission component 340 of server 310 to the reception component 360 of client device 350. In some instances, the frames may be transmitted via a user datagram protocol (UDP) internet protocol (IP) (UDP/IP) network protocol. On the client device 350, the frames 342 may be received via the reception component 360, e.g., received via a UDP/IP network protocol. The frames 342 may also undergo a de-packetization process 370, e.g., a real-time transport protocol (RTP) de-packetization process, which may convert the data packets into data/content. After de-packetization, the data/content may be decoded during decoding process 380. Finally, the decoded data/content may be sent to a display or HMD of client device 350 for display of the data/content.

As indicated above, aspects of graphics processing may deal with rendering or displaying different types of content, e.g., virtual reality (VR) content, extended reality (XR), or augmented reality (AR) content. The content may be rendered or created on a server, e.g., a computer or phone. To display this content, users may utilize different types of headsets or display glasses, which may be referred to as a client device. In some instances, when a user wants to use XR glasses for a long duration in the absence of a charging facility, it is desirable to save power at the server or client device. Also, when the battery of either the client device or the server is getting low (i.e., beyond a threshold percentage decided by the user) it is desirable to save power at the server or client device. Moreover, if a user wants to extent battery life voluntarily, then it is desirable to save power at the server or client device and provide a long battery life to either device.

In split rendering applications, content may be rendered on servers and encoded/streamed to XR-based HMDs over Wi-Fi. As indicated above, split rendering means the XR workload may be split between two devices, i.e., the host/server and the client/HMD. For example, one use case is a smartphone connected to HMD/AR glasses. AR glasses may not have high processing capabilities, and heat dissipation may be an issue if all the processing is performed on the client/glasses. Accordingly, it is beneficial to split the rendering between the server and the client device.

In one aspect, a pose (e.g., a six degree of freedom (6DOF) pose) may be generated on the client device. The client/HMD may send the 6DOF pose data to the server via an uplink connection. An application or game may then render the content using the transmitted 6DOF pose on the server/phone. Also, the encoding of rendered content may occur on the server/phone. The encoded and compressed bit stream may then be transmitted from the server/phone to the HMD/client via a downlink connection. After this, video decoding and time warp processing may be performed on the HMD/client using the latest 6DOF pose. Finally, the HMD/client may display the re-projected content.

Figure 4:
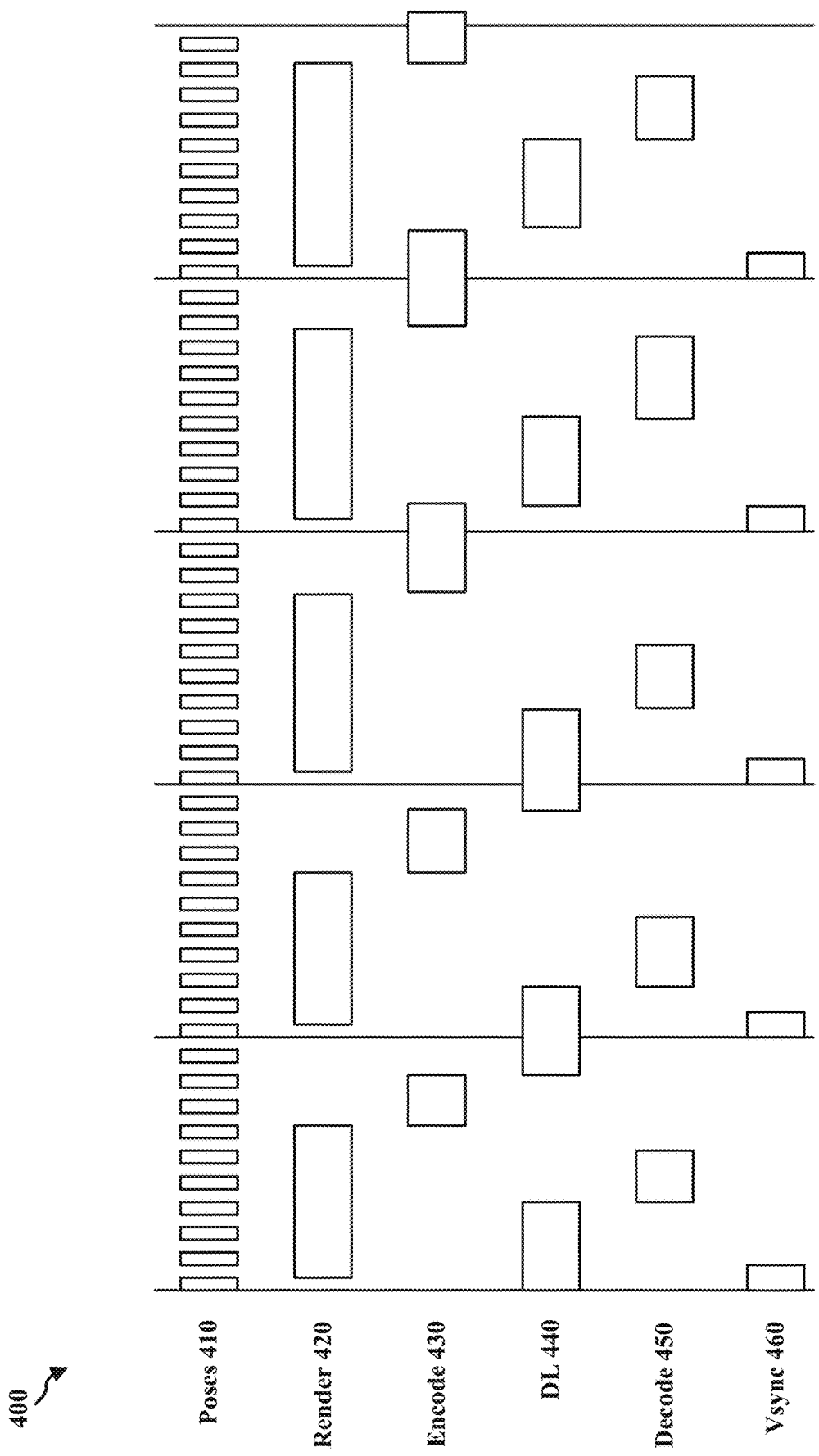
FIG. 4 is a diagram illustrating an example timeline of a split rendering process.

FIG. 4 illustrates a diagram 400 of an example timeline of a split rendering process. More specifically, FIG. 4 shows a diagram 400 of a timeline of different processing steps at a server (e.g., phone, smart phone, or computer) and a client device (e.g., headset, HMD, or smart glasses). For instance, a client device may transmit a number of poses 410 (e.g., head poses) to the server. The server may then render content for a frame at render process 420, as well as encode the frame at encode process 430. Also, the server may transmit the frame to the client device via downlink (DL) 440. After receiving the frame, the client device may decode the frame at decode process 450. FIG. 4 also shows a vertical synchronization (VSync) 460 that is associated with each of the transmissions.

As shown in FIG. 4, head pose data may be transmitted from the client device to the server via uplink (UL) at a high rate (e.g., 500 Hz) and/or a low latency. The client device (e.g., HMD/glasses) may be unaware of the rendering start time on the server (e.g., phone). The rendering of the first frame on the server may start at an arbitrary time using the latest pose followed by the rendering of future frames at a preconfigured frames-per-second (fps) rate. A rendering thread may render frames as fast as a GPU allows without any wait time, and in order to limit the fps, the wait time may be added at the end of each rendering. Also, the rendering thread may sleep until the wait time before starting the rendering for the next frame. Further, upon rendering, each rendered frame may be immediately queued for encoding. Once the encoding is completed, encoded frames may be packetized and transmitted (via downlink) at an arbitrary time (e.g., the post-rendering time plus the encode time). In some example, a Wi-Fi modem may be always "on" so that the pose and frames may be transmitted with a minimum latency.

Some aspects of split rendering may utilize a number of different features, such as a target wake time (TWT) and a timing synchronization function (TSF). The TWT feature may allow a modem/radio frequency (RF) to be to switched on at a fixed cadence and for a known service period. This TWT feature may be utilized to save power on the server and the client device. While TWT may ensure a power reduction on the modem side, the selection of TWT parameters may influence XR performance, such as the latency and frame reuse (i.e., judder). In some instances, the TWT feature may allow UL (pose) data and DL (rendered+encoded) frame data to be aligned with a TWT service period (On Period), i.e., the transmission (Tx) and reception (Rx) on the client device and the server may happen simultaneously. When data is transmitted simultaneously within the same service period, it may provide the modem a chance to sleep for a certain time, which may reduce power and thermal issues. In some Wi-Fi scenarios, each station (STA) may have a timer synchronized with a timing synchronized function (TSF), e.g., associated with a service access point (SAP). Additionally, early termination may allow a service period to be terminated early on detection of inactivity of DL/UL data. Early termination processes may include an end of service period (EOSP). For example, the ESOP may terminate a service interval (i.e., transition the service interval from an "on" period to an "off" period). Wi-Fi TWT may allow a modem to turn on and off at a defined cadence. TWT may also support early termination, such as if data is not present for transmission for a defined time period, the modem may turn off.

FIGS. 5A and 5B illustrates diagrams 500 and 550, respectively, of example timelines of split rendering processes. More specifically, FIG. 5A shows a diagram 500 of a split rendering timeline including DL data 510, UL data 512, end of service period (EOSP) 530, EOSP 532, as well as latency in the service period. FIG. 5A depicts a problem with unsynchronized UL/DL data with an optimized transmission. For instance, FIG. 5A illustrates when UL/DL data is too far ahead with respect to the start of a service period. As shown in FIG. 5A, the data transmission may start when the service period is opened. Once the data transmission is completed, the TWT window may be early terminated, as indicated by EOSP 530 and EOSP 532. As shown in FIG. 5A, in this case, additional latencies may be added.

FIG. 5B shows a diagram 550 of a split rendering timeline including DL data 560, UL data 562, end of service period (EOSP) 580, as well as a delay in the service period. FIG. 5B depicts another problem with unsynchronized UL/DL data with an optimize transmission. For instance, FIG. 5B illustrates when UL/DL data is too late with respect to the start of a service period. As shown in FIG. 5B, the data transmission may start if the service period is not early terminated. Once data transmission is completed, the TWT window may be early terminated, as indicated by EOSP 580. As shown in FIG. 5B, in this case, power consumption may be increased as a modem may not get a chance to turn off. In cases where the service period is early terminated before queuing the data, the data transmission may start in the next service period, which may add a delay or latency.

FIGS. 6A and 6B illustrates diagrams 600 and 650, respectively, of example timelines of a split rendering process. More specifically, FIG. 6A shows a diagram 600 of a split rendering timeline including DL 610, decode process 620, VSync 630, and TWT service period 640 (including a service period (SP) start time and an SP end time). FIG. 6B shows a diagram 650 of a split rendering timeline including DL 660, decode process 670, VSync 680, and TWT service period 690 (including an SP start time and an SP end time). As shown in FIG. 6A, if a decode out occurs at a time greater than a half VSync time (½ VSync), the decoded frame may not be displayed in the next immediate VSync. As shown in FIG. 6B, if a decode out occurs too early before a half VSync time, this may add a latency.

In some aspects of split rendering, wireless AR clients/glasses may utilize certain types of designs (e.g., sleek and/or light weight designs), which may pose battery consumption and thermal dissipation challenges. For example, one of the contributors of power consumption on AR glasses may be wireless transmission. Power savings may be realized by traffic shaping the uplink and downlink transmissions between the server/phone and the client/glasses, but this may result in higher latency and visual quality issues if the synchronization with real-time XR processing is not performed. Based on the above, it may be beneficial to provide split rendering synchronization at the split rendering framework level, such as for certain types of schemes (e.g., Wi-Fi TWT). For example, it may be beneficial to provide split rendering synchronization including power and thermal optimizations. It may also be beneficial to provide an improved visual quality for a display timeline, which may reduce the amount of duplicate displays.

Aspects of the present disclosure may utilize split rendering synchronization at the split rendering framework level, such as for certain types of schemes (e.g., Wi-Fi TWT). Additionally, aspects presented herein may utilize split rendering synchronization including power and thermal optimizations. Aspects presented herein may also utilize improved visual quality close to a display timeline, which may reduce the amount of duplicate displays. Moreover, for split rendering processes, aspects of the present disclosure may utilize techniques in XR applications to achieve synchronization to work with optimized transmission schemes, e.g., Wi-Fi TWT.

Figure 7:
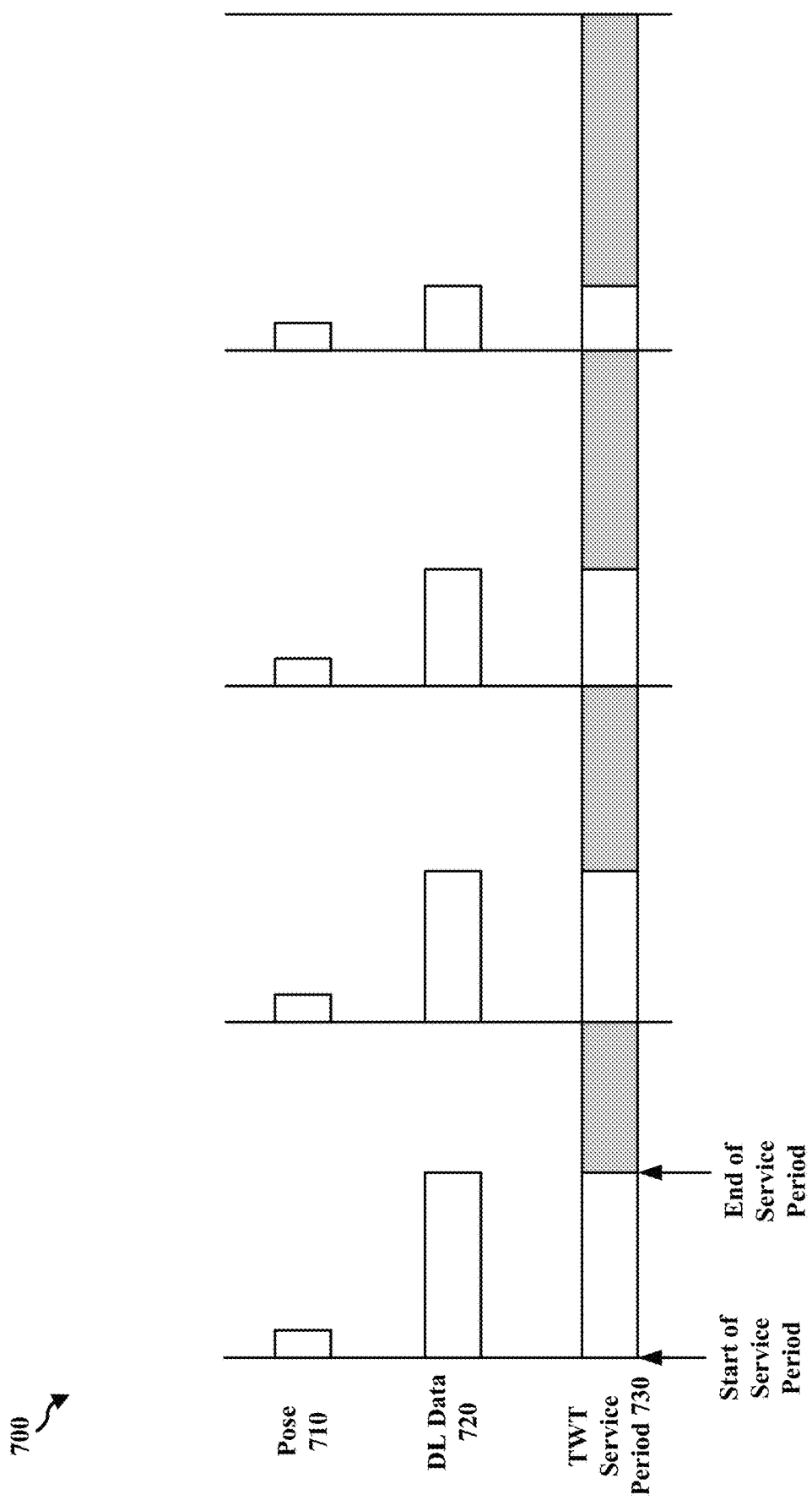
FIG. 7 is a diagram illustrating an example timeline of a split rendering process.

FIG. 7 illustrates a diagram 700 of an example timeline of a split rendering process. More specifically, FIG. 7 shows a timeline of a split rendering process including a synchronization of UL and DL data in split XR with a TWT service period (SP). Diagram 700 in FIG. 7 includes pose 710, DL data 720, and TWT service period 730. FIG. 7 also illustrates a start of the service period and an end of the service period (EOSP). The method shown in FIG. 7 uses a head pose data transmission of DL/UL data that is synchronized with a TWT service period.

The split rendering process in FIG. 7 may utilize a client device/glasses or a server/phone. The client device/glasses may use a common clock (e.g., a TSF) to synchronize events between the client and the server. Also, the client device may send a single pose 710 at the start of the TWT service period 730. At the server/phone, rendering may first wait for a start of the next service period rather than for a pose or a timeout. By doing so, the encode out may be completed before the start of the next service period. As soon as next service period starts, the transmission for a previous encoded frame may begin. At the same time, during the start of a next service period, a new head pose may be sent from the client to trigger rendering at the server.

Figure 8:
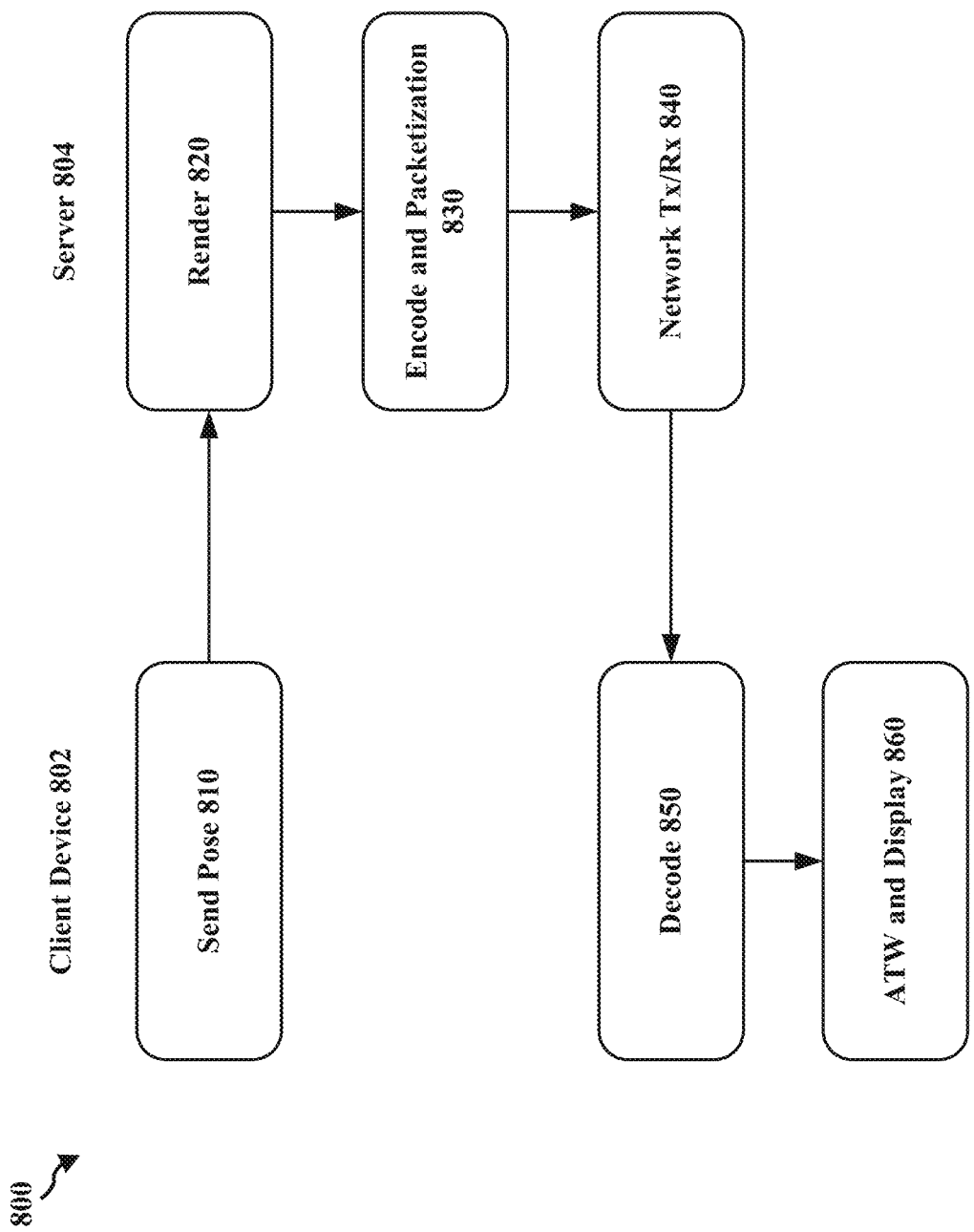
FIG. 8 is a diagram illustrating an example split rendering process.

FIG. 8 illustrates a diagram 800 of an example split rendering process. More specifically, FIG. 8 shows a split rendering process including functional components of a split XR framework. Diagram 800 in FIG. 8 includes client device 802 that may perform the following steps: send pose 810, decode 850, and asynchronous time warp (ATW) and display 860. Also, server 804 may perform the following steps: render 820, encode and packetization 830, and network Tx/Rx 840.

As shown in FIG. 8, client device 802 may transmit a single pose at the start of service period (e.g., at send pose 810). As network delays may be unpredicted, there may be scenarios when pose data may be lost or a timeout occurs. In such cases, frames may be rendered using an older pose. Once a TWT session is established by the client device 802, the server 804 may read the session information using an interface (e.g., a netlink interface). The server 804 may first wait for a start of the next service period and then wait for a pose or a timeout, after which rendering may begin (e.g., at render 820). Once the rendering is complete, an encode out may occur before the start of the next service period (e.g., at encode and packetization 830) and the encoded frame data may be packetized (e.g., at encode and packetization 830) and transmitted over the link (e.g., at network Tx/Rx 840). On client device 802, once frame data is received, it may be decoded (e.g., at decode 850), and the ATW may be processed and displayed at ATW and display 860.

FIG. 9 illustrates a diagram 900 of an example split rendering process. More specifically, FIG. 9 shows a split rendering process including functional components of a split XR framework. Diagram 900 in FIG. 9 includes pose block 902 and render block 904. As shown in FIG. 9, pose block 902 may include the following steps: connect to network 910, check if TWT SP started 920, and if so, send a single pose at the start of TWT SP 930. Render block 904 may include the following steps: wait for a head pose or timeout 950, obtain a head pose 960, render 970, and wait for the next TWT SP 980.

Figure 10:
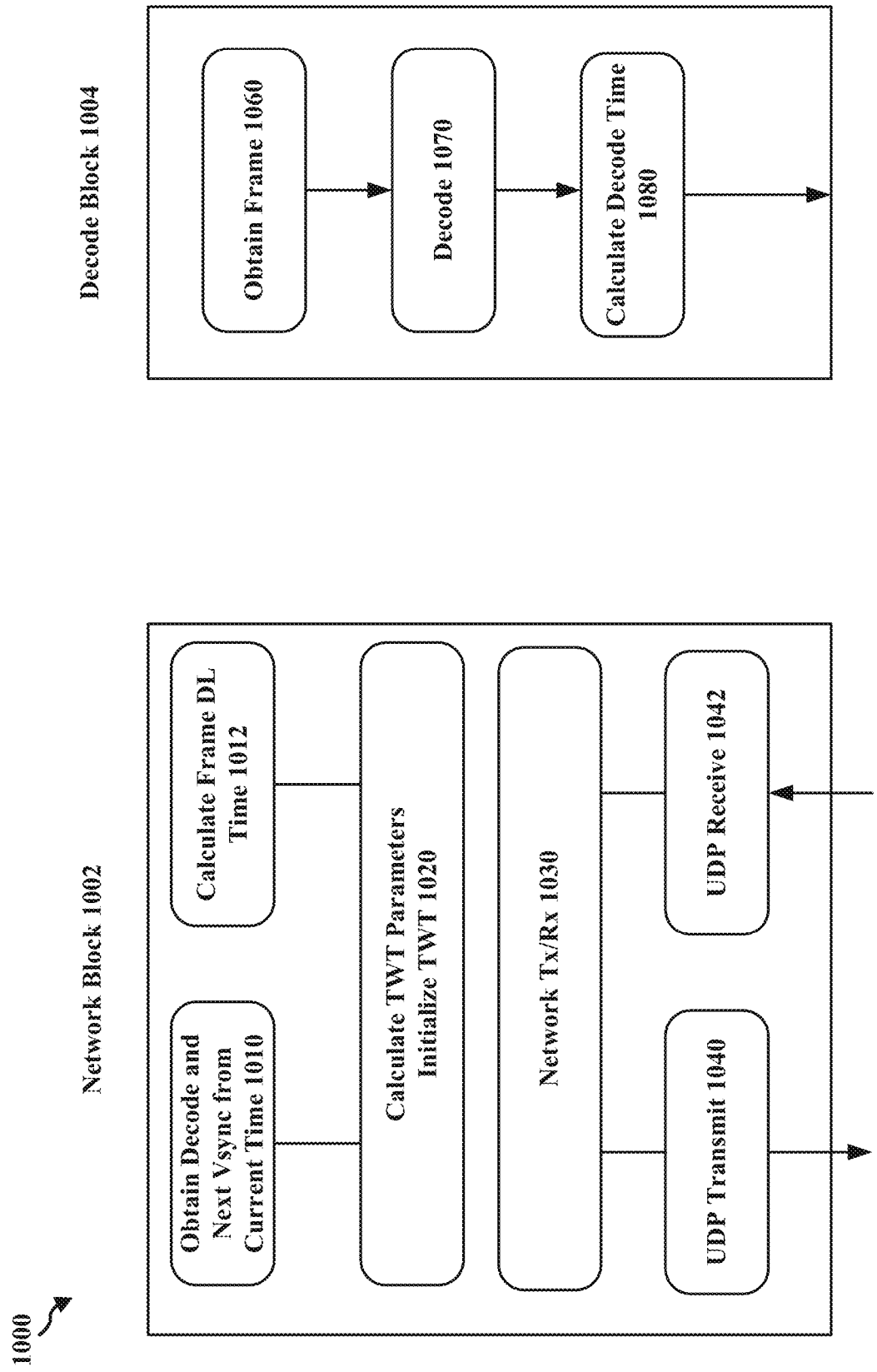
FIG. 10 is a diagram illustrating an example split rendering process.

FIG. 10 illustrates a diagram 1000 of an example split rendering process. More specifically, FIG. 10 shows a split rendering process including functional components of a split XR framework. Diagram 1000 in FIG. 10 includes network block 1002 and decode block 1004. As shown in FIG. 10, network block 1002 may include the following steps: obtain decode and next VSync from current time 1010, calculate frame DL time 1012, calculate TWT parameters and initialize TWT 1020, network Tx/Rx 1030, user datagram protocol (UDP) transmit 1040, and UDP receive 1042. Decode block 1004 may include the following steps: obtain frame 1060, decode 1070, and calculate decode time 1080.

Aspects of the present disclosure may also utilize a synchronized VSync timing. For instance, using a common clock (e.g., a TSF), the start of a service period may be aligned with the VSync, such that ATW processed frames may be available to a display thread at a half VSync time (½ VSync), and may be displayed immediately on the next VSync. In order to synchronize VSync with a decode out, aspects of the present disclosure may calculate: (1) a time to a next VSync from a current time, (2) an amount of the decode time (e.g., 95% of the decode time), (3) an amount of the DL time (e.g., 95% of DL time), and/or (4) support to define an absolute time for a first TWT window. As indicated herein, a time to the next VSync may be calculated and a start of the first TWT service period may be set such that the decode out occurs before the half VSync time (½ VSync) for a certain amount of time (e.g., 95% of the time). This way, 95% of time frames may be available at ½ VSync and latencies may be reduced. For instance, the following formula may be the calculation to align VSync with a TWT service period: start of first TWT SP=next VSync+½ VSync−(95% decode time+95% DL time). For a DL time calculation, each RTP packet on the server side may be attached with a TSF time, and once the packet is received on the client side, aspects presented herein may read a local TSF time. Since TSF is a synchronized time stamp, aspects presented herein may calculate a DL time using the following formula: [current TSF time when the last packet of the left eye is received]−[first packet time in RTP packet for the right eye]. VSync and TWT synchronization may show the best optimized latencies when a rendering rate (e.g., a TWT rate) is an integer multiple of the display rate or VSync rate.

Figure 11:
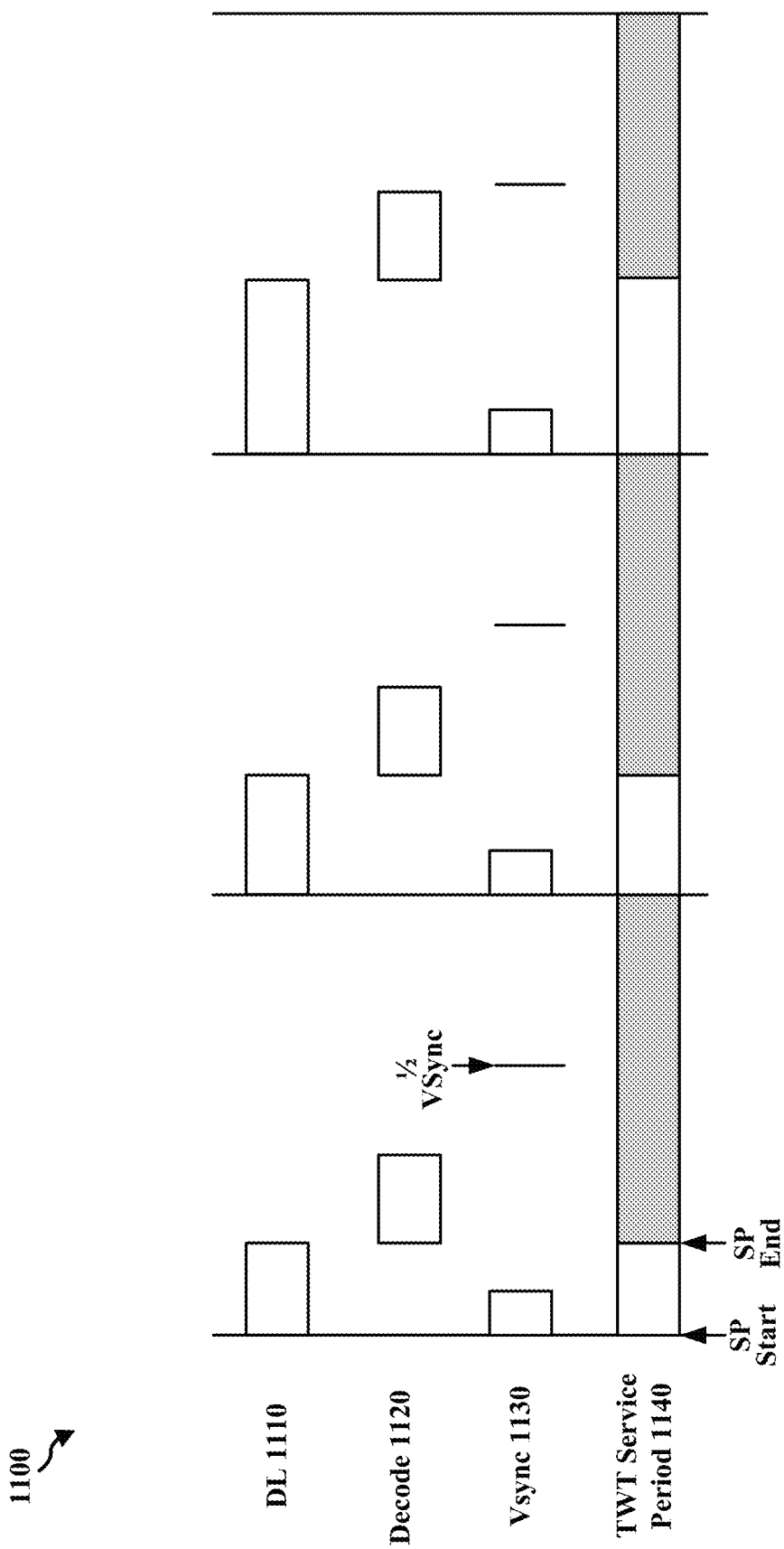
FIG. 11 is a diagram illustrating an example timeline of a split rendering process.

FIG. 11 illustrates a diagram 1100 of an example timeline of a split rendering process. More specifically, FIG. 11 shows a split rendering process including a synchronized VSync. Diagram 1100 in FIG. 11 includes DL 1110, decode 1120, VSync 1130, and TWT service period 1140. Also, FIG. 11 depicts a ½ VSync time, a start of the TWT service period (SP start), and an end of the TWT service period (SP end). As shown in FIG. 11, aspects presented herein may provide a synchronization of VSync, DL data, and a TWT service period.

Figure 12:
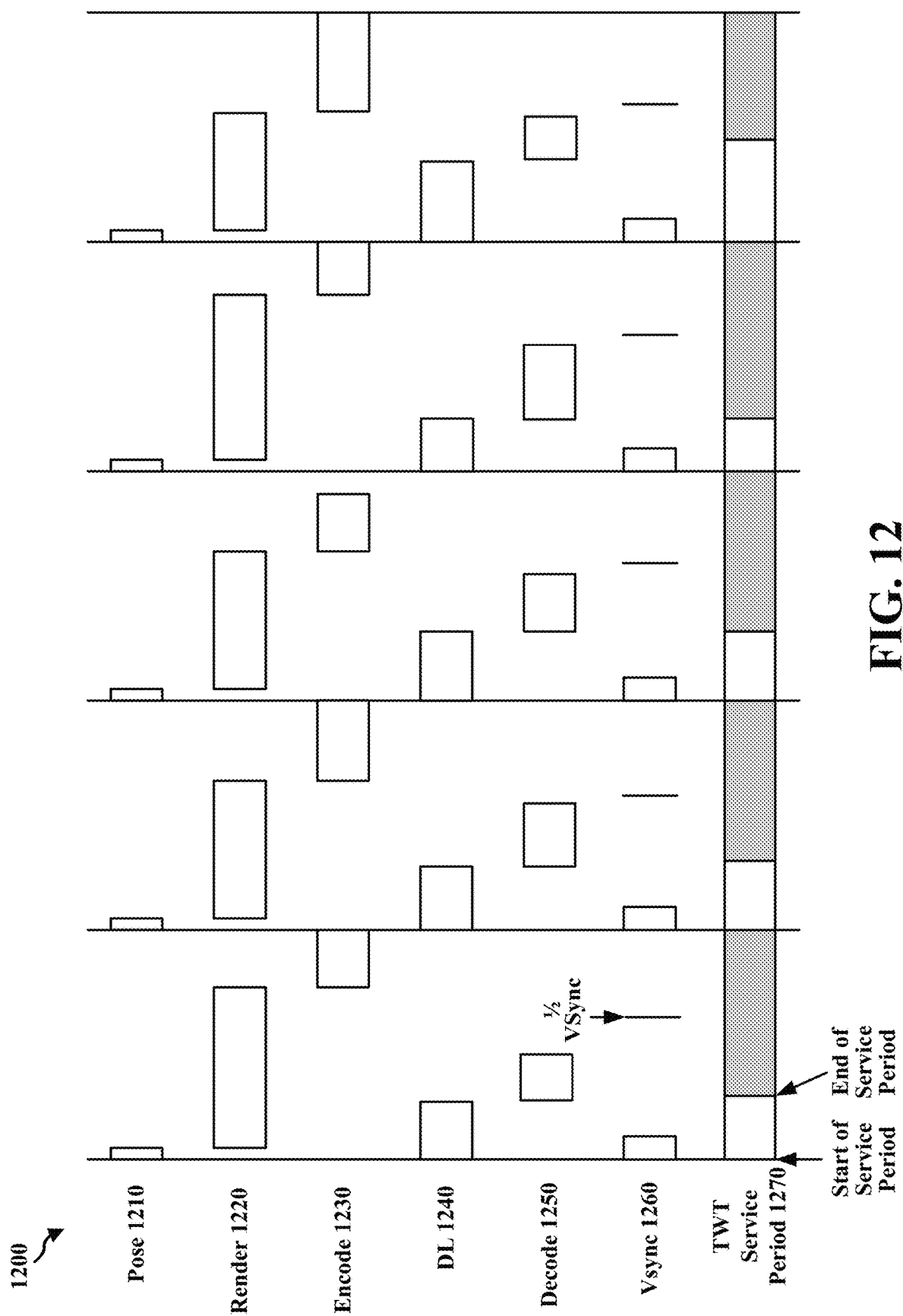
FIG. 12 is a diagram illustrating an example timeline of a split rendering process.

FIG. 12 illustrates a diagram 1200 of an example timeline of a split rendering process. More specifically, FIG. 12 shows a split rendering process including a timing diagram for a TWT service period. Diagram 1200 in FIG. 12 includes pose 1210 (e.g., a single pose transmission), render 1220, encode 1230, DL 1240, decode 1250, VSync 1260, and TWT service period 1270. Also, FIG. 12 depicts a ½ VSync time, a start of the TWT service period, and an end of the TWT service period (EOSP). As shown in FIG. 12, the decode 1250 may occur prior to the ½ VSync time. Further, as depicted in FIG. 12, aspects presented herein may provide a synchronization of VSync, DL data, and a TWT service period.

FIGS. 13A and 13B illustrate diagrams 1300 and 1350, respectively, of example timelines of a split rendering process. More specifically, FIG. 13A shows a split rendering process including a timing diagram for a TWT service period, where the pose is transmitted at the start of a service period. Diagram 1300 in FIG. 13A includes pose 1310 (e.g., a single pose transmission), render 1312, encode 1314, DL 1316, decode 1318, VSync 1320, and TWT service period 1322. Also, FIG. 13A depicts a ½ VSync time, a start of the TWT service period, and an end of the TWT service period (EOSP). FIG. 13A depicts the existence of latencies with a fixed pose transmission. For example, if the time for render 1312 and encode 1314 is too small, such that the encode out occurs just after EOSP and if the pose 1310 is transmitted at the start of TWT service period 1322, latencies may be increased as the DL transmission (e.g., DL 1316) may occur in the next service period. As the time for render 1312 and encode 1314 is short, the encode out may occur well before the start of the next service period.

FIG. 13B illustrates a split rendering process including a timing diagram for a TWT service period, where the pose is transmitted in a service period based on calculated values (e.g., proportional-integral-derivative (PID) calculated values). Diagram 1350 in FIG. 13B includes pose 1360 (e.g., a single pose transmission), render 1362, encode 1364, DL 1366, decode 1368, VSync 1370, and TWT service period 1372. Also, FIG. 13B depicts a ½ VSync time, a start of the TWT service period, and an end of the TWT service period (EOSP). FIG. 13B depicts one example of a just-in-time pose transmission. For instance, if a pose (e.g., pose 1360) is sent later in a service period, latencies may be reduced, i.e., the encode out may occur at the start of the next service period. The latency calculated on the server may be provided as feedback to the client device and the software on the client side may perform adjustments using an algorithm (e.g., a PID algorithm) to send the pose later in the service period to minimize the latency. Accordingly, in FIG. 13B, the single pose 1360 is transmitted in the middle of TWT service period 1372, such that the encode out occurs at the start of the next service period.

Aspects presented herein may also utilize a sample algorithm to adjust a pose transmission (e.g., a just-in-time pose transmission) based on latency. For instance, a server/phone may calculate a latency (i.e., a latency based on a transmission of a pose) and then send feedback regarding the latency to the client/glasses. The client/glasses may receive the latency feedback from the server/phone and then run a PID algorithm. Based on the PID algorithm, the client/glasses may shift a pose towards the start of a service period or shift the pose towards the end of a service period.

Figure 14A:
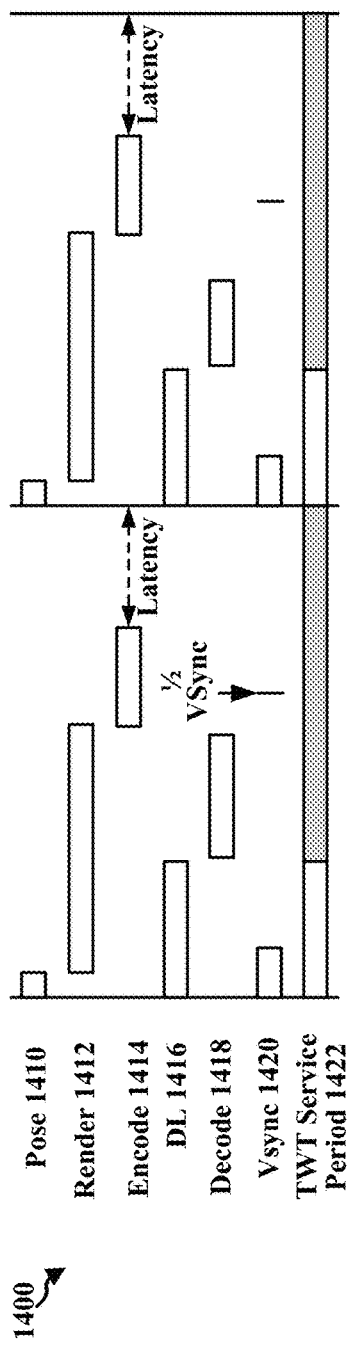
FIG. 14A is a diagram illustrating an example timeline of a split rendering process.
Figure 14B:
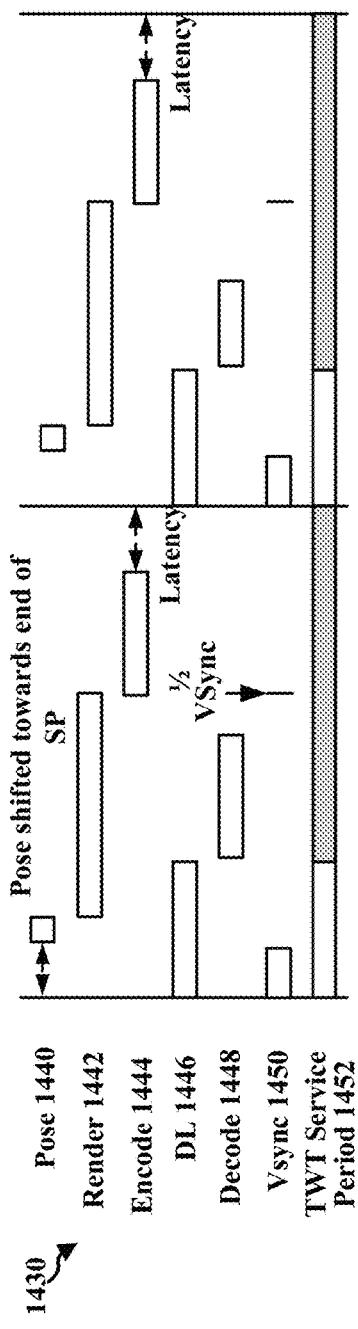
FIG. 14B is a diagram illustrating an example timeline of a split rendering process.
Figure 14C:
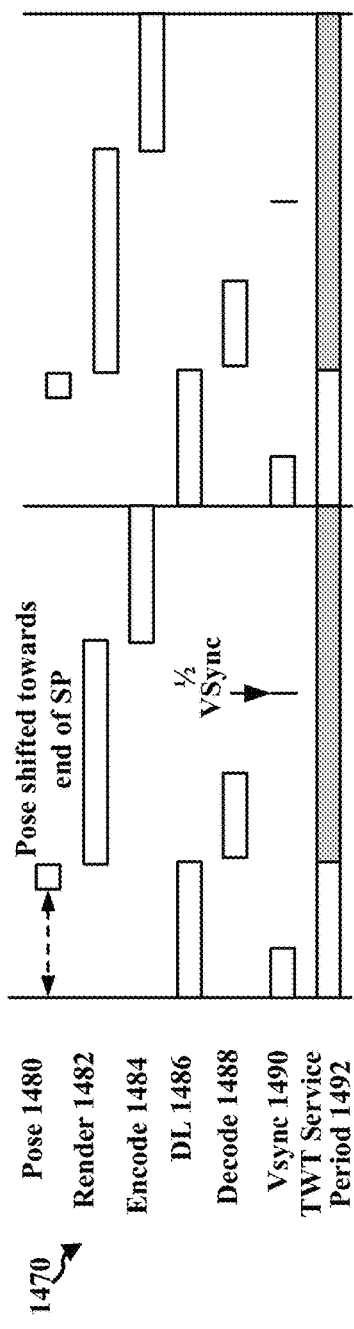
FIG. 14C is a diagram illustrating an example timeline of a split rendering process.

FIGS. 14A, 14B, and 14C illustrate diagrams 1400, 1430, and 1470, respectively, of example timelines of a split rendering process. More specifically, FIG. 14A shows a split rendering process including a timing diagram for a TWT service period, where the pose is transmitted at the start of a service period. Diagram 1400 in FIG. 14A includes pose 1410 (e.g., a single pose transmission), render 1412, encode 1414, DL 1416, decode 1418, VSync 1420, and TWT service period 1422. Also, FIG. 14A depicts a ½ VSync time, a start of the TWT service period, and an end of the TWT service period (EOSP). FIG. 14A depicts a timeline diagram for a TWT service period where a single pose is transmitted at the start of the service period, but the encode out occurs before the start of the service period, such that there is a latency.

FIG. 14B shows a split rendering process including a timing diagram for a TWT service period, where the pose transmission is shifted towards the end of a service period. Diagram 1430 in FIG. 14B includes pose 1440 (e.g., a single pose transmission), render 1442, encode 1444, DL 1446, decode 1448, VSync 1450, and TWT service period 1452. FIG. 14B also depicts a ½ VSync time, a start of the TWT service period, and an end of the TWT service period (EOSP). FIG. 14B depicts that using latency as an input (e.g., an input PID algorithm) may shift the pose towards the end of the service period until the latency is reduced.

FIG. 14C shows a split rendering process including a timing diagram for a TWT service period, where the pose transmission is shifted towards the end of a service period. Diagram 1470 in FIG. 14C includes pose 1480 (e.g., a single pose transmission), render 1482, encode 1484, DL 1486, decode 1488, VSync 1490, and TWT service period 1492. Further, FIG. 14C depicts a ½ VSync time, a start of the TWT service period, and an end of the TWT service period (EOSP). FIG. 14C depicts that using latency as an input (e.g., an input PID algorithm) may shift the pose towards the end of the service period until the latency is eliminated.

Figure 15A:
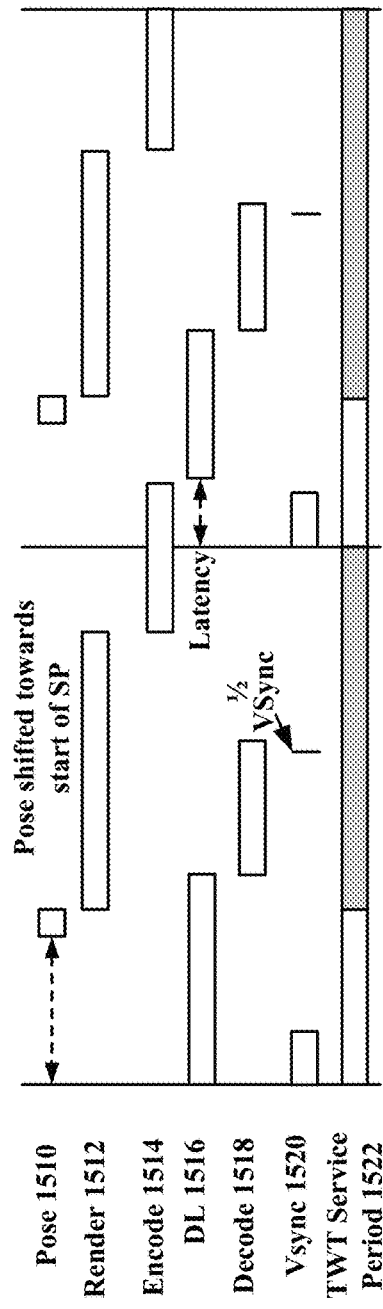
FIG. 15A is a diagram illustrating an example timeline of a split rendering process.
Figure 15B:
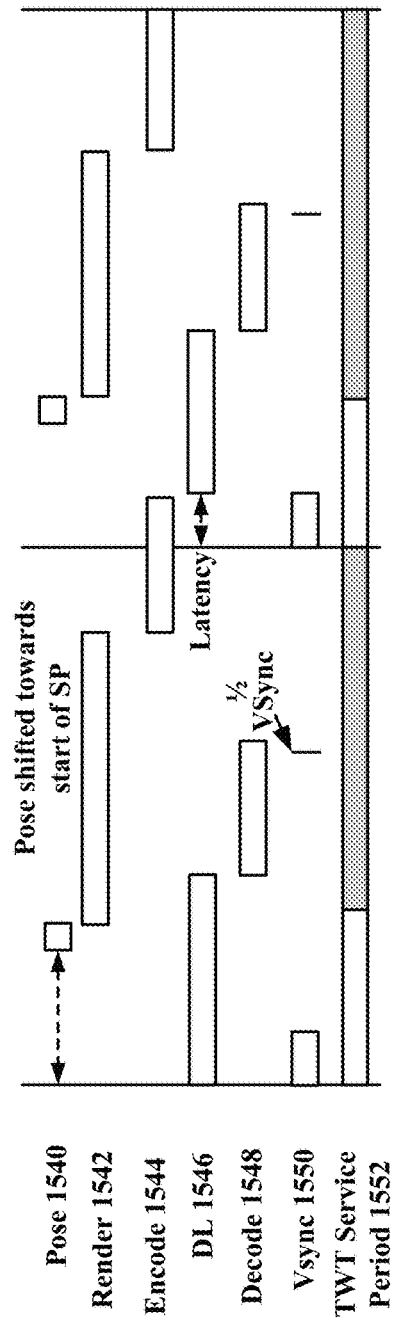
FIG. 15B is a diagram illustrating an example timeline of a split rendering process.
Figure 15C:
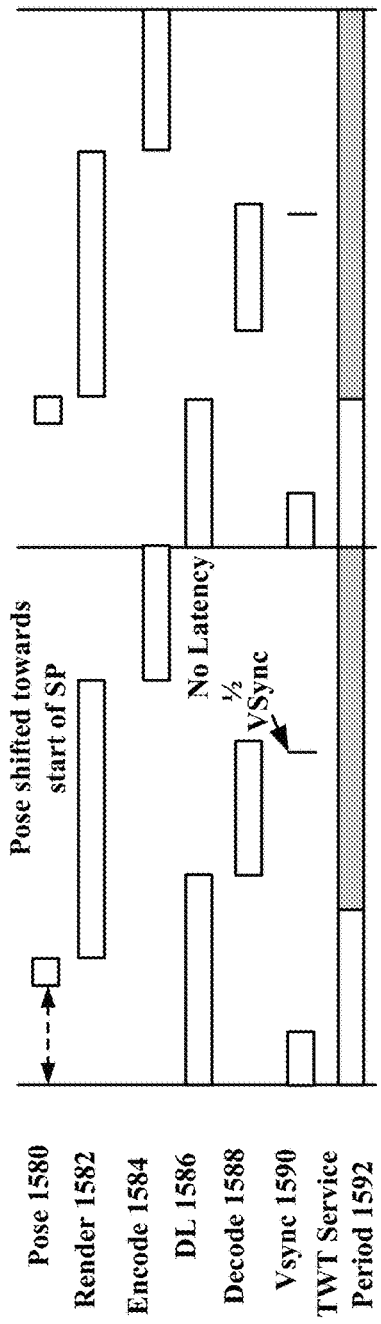
FIG. 15C is a diagram illustrating an example timeline of a split rendering process.

FIGS. 15A, 15B, and 15C illustrate diagrams 1500, 1530, and 1570, respectively, of example timelines of a split rendering process. More specifically, FIG. 15A shows a split rendering process including a timing diagram for a TWT service period, where the pose is transmitted in the middle of a service period. Diagram 1500 in FIG. 15A includes pose 1510 (e.g., a single pose transmission), render 1512, encode 1514, DL 1516, decode 1518, VSync 1520, and TWT service period 1522. Also, FIG. 15A depicts a ½ VSync time, a start of the TWT service period, and an end of the TWT service period (EOSP). FIG. 15A depicts a timeline diagram for a TWT service period where a single pose is transmitted in the middle of a service period, but the encode out occurs after the start of the service period, such that there is a latency.

FIG. 15B shows a split rendering process including a timing diagram for a TWT service period, where the pose transmission is shifted towards the start of a service period. Diagram 1530 in FIG. 15B includes pose 1540 (e.g., a single pose transmission), render 1542, encode 1544, DL 1546, decode 1548, VSync 1550, and TWT service period 1552. FIG. 15B also depicts a ½ VSync time, a start of the TWT service period, and an end of the TWT service period (EOSP). FIG. 15B depicts that using latency as an input (e.g., an input PID algorithm) may shift the pose towards the start of the service period until the latency is reduced.

FIG. 15C shows a split rendering process including a timing diagram for a TWT service period, where the pose transmission is shifted towards the start of a service period. Diagram 1570 in FIG. 15C includes pose 1580 (e.g., a single pose transmission), render 1582, encode 1584, DL 1586, decode 1588, VSync 1590, and TWT service period 1592. Further, FIG. 15C depicts a ½ VSync time, a start of the TWT service period, and an end of the TWT service period (EOSP). FIG. 15C depicts that using latency as an input (e.g., an input PID algorithm) may shift the pose towards the start of the service period until the latency is eliminated. In some instances, a valid range for a pose transmission may be when DL is active, i.e., the pose may be sent between the start of the service period and the end of the DL. This may help a modem to execute an EOSP and save more power. In some scenarios, the rendering process may use a slightly older pose.

Figure 16:
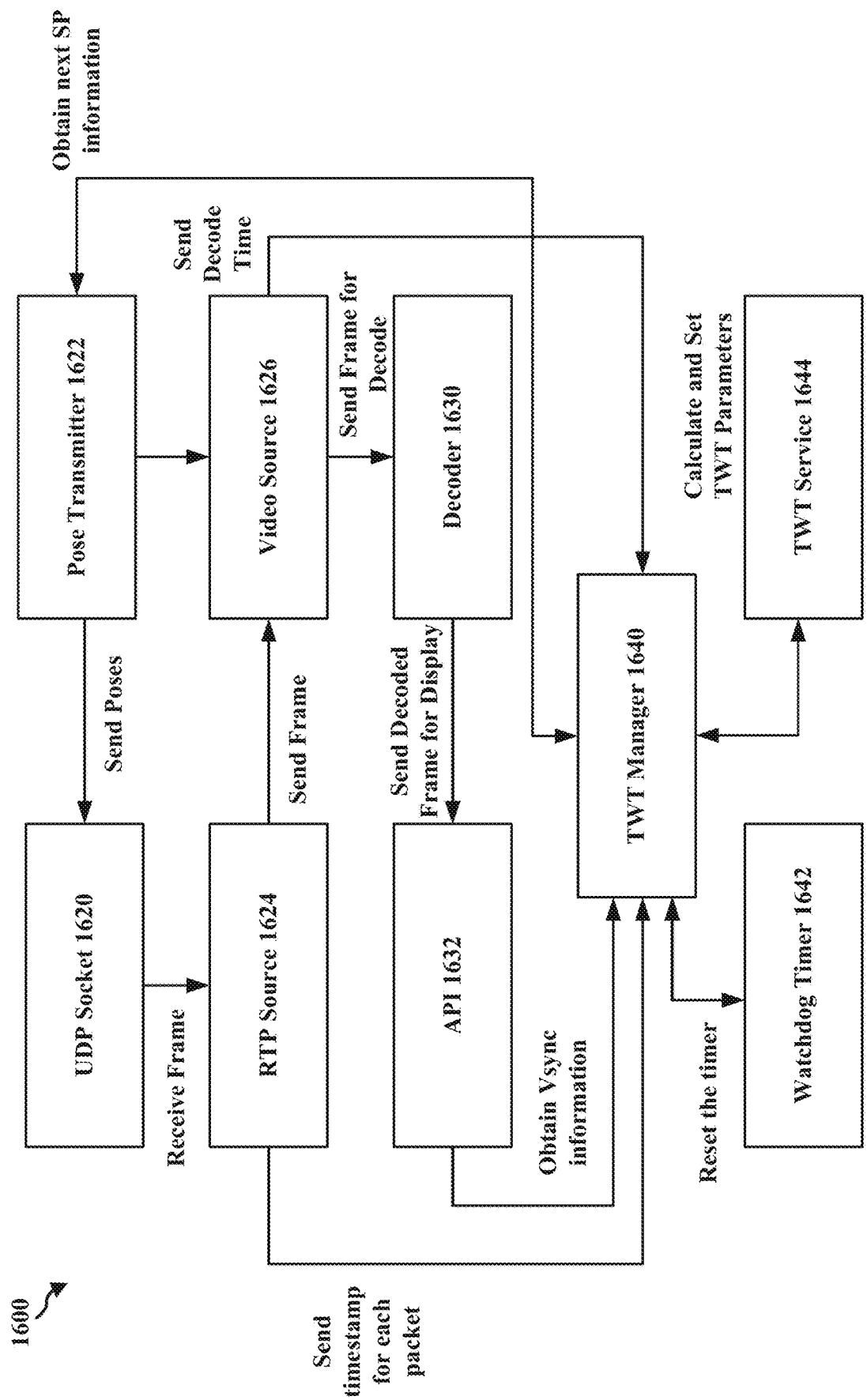
FIG. 16 is a diagram illustrating an example split rendering process.

FIG. 16 illustrates a diagram 1600 of an example split rendering process. More specifically, FIG. 16 shows a split rendering process at a client device/HMD/glasses. Diagram 1600 in FIG. 16 includes UDP socket 1620, pose transmitter 1622, RTP source 1624, video source 1626, decoder 1630, application program interface (API) 1632, TWT manager 1640, watchdog timer 1642, and TWT service 1644. As shown in FIG. 16, pose transmitter 1622 may send poses to the UDP socket 1620, which may send a received frame to the RTP source 1624. RTP source 1624 may send the frame to the video source 1626, which may send the frame to decoder 1630. Decoder 1630 may send the decoded frame for display to API 1632. API 1632 may obtain VSync information from TWT manager 1640. RTP source 1624 may send a timestamp for each packet to TWT manager 1640. Further, TWT manager 1640 may reset a time with watchdog timer 1642. TWT service 1644 may calculate and set TWT parameters. Also, TWT manager 1640 may obtain the next SP information.

Figure 17:
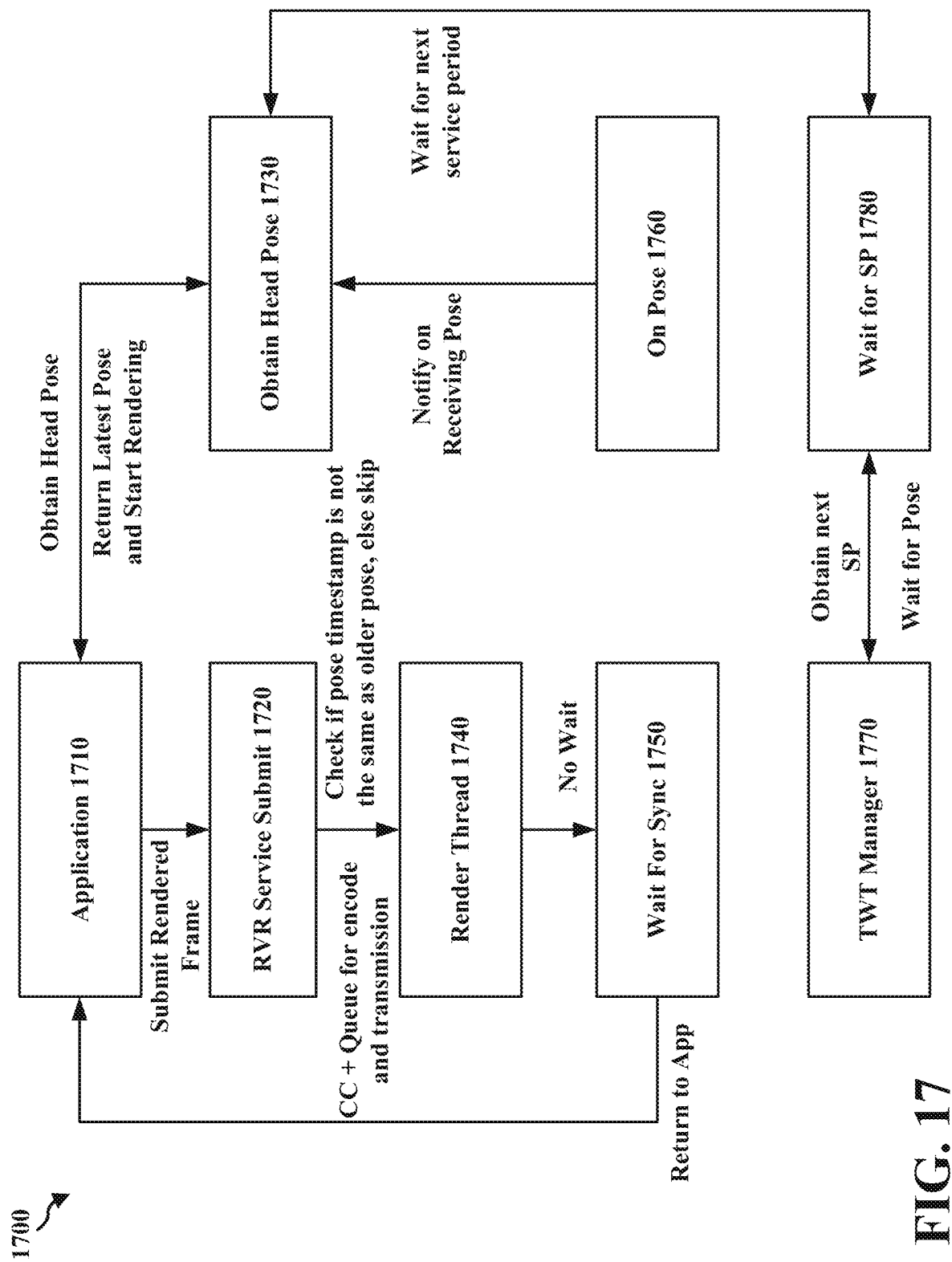
FIG. 17 is a diagram illustrating an example split rendering process.

FIG. 17 illustrates a diagram 1700 of an example split rendering process. More specifically, FIG. 17 shows a split rendering process at a server/phone. Diagram 1700 in FIG. 17 includes application 1710, rendered virtual reality (RVR) service submit 1720, obtain head pose 1730, render thread 1740, wait for synchronization 1750, on pose 1760, TWT manager 1770, and wait for SP 1780. As shown in FIG. 17, application 1710 may obtain a head pose from obtain head pose 1730, as well as return to a latest pose and start rendering. Application 1710 may submit the rendered frame to the RVR service submit 1720, which may check if the pose timestamp is not the same as an older pose, if not this may be skipped. Further, RVR service submit 1720 may copy (CC) and queue for encode and transmission with render thread 1740. Next, wait for synchronization 1750 may determine if there is no wait. Wait for synchronization 1750 may also return to the application 1710. On pose 1760 may notify once a pose is received. Also, TWT manager 1770 may obtain a next SP from wait for SP 1780, which may wait for the next pose. Wait for SP 1780 may also wait for the next service period.

Figure 18:
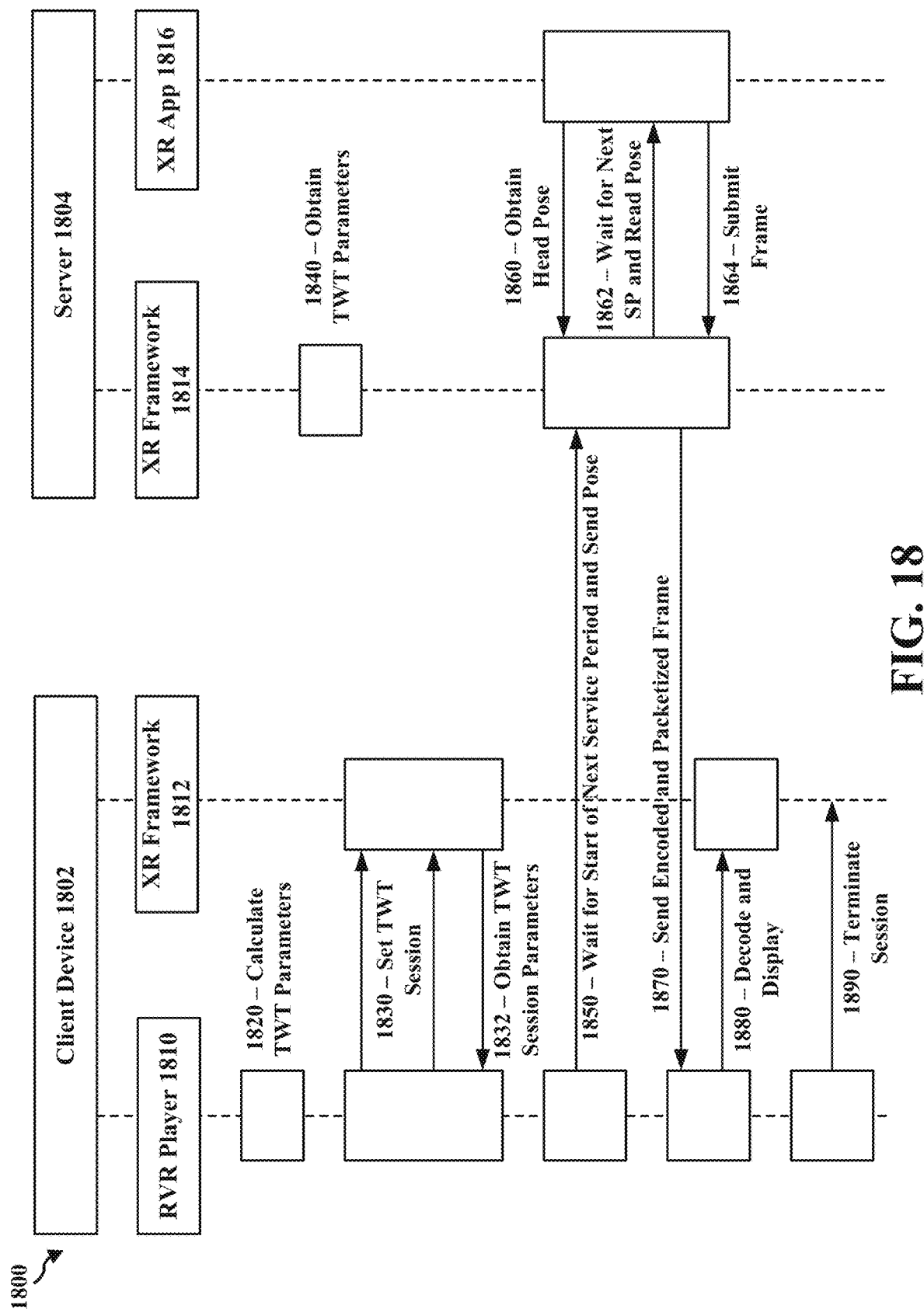
FIG. 18 is a diagram illustrating example communications between a client device and a server.

FIG. 18 illustrates a diagram 1800 of example communications between a client device 1802 and a server 1804. More specifically, FIG. 18 shows a timeline of a split rendering process at a client device 1802 (including RVR player 1810 and XR framework 1812) and a server 1804 (including XR framework 1814 and XR application 1816). At 1820, RVR player 1810 may calculate one or more TWT parameters. At 1830, RVR player 1810 may set the TWT session with XR framework 1812. At 1832, XR framework 1812 may obtain the TWT session parameters from RVR player 1810. At 1840, XR framework 1814 may obtain the TWT parameters. At 1850, RVR player 1810 may wait for the start of the next service period and send the pose to the XR framework 1814. At 1860, XR application 1816 may obtain the head pose. At 1862, XR application 1816 may wait for the next SP and read the pose. At 1862, XR application 1816 may submit the rendered frame to the XR framework 1814. At 1870, XR framework 1814 may send the encoded and packetized frame to the RVR player 1810. At 1880, RVR player 1810 may decode and display the frame with XR framework 1812. Finally, at 1890, RVR player 1810 may terminate the session.

Aspects of the present disclosure may include a number of benefits or advantages. As indicated above, aspects of the present disclosure may improve both the power reduction and the overall user experience. Regarding improving the power reduction, a decreased number of poses may need to be sent as compared to unsynchronized methods, e.g., in unsynchronized methods the poses may be sent at a 500 Hz rate. In aspects of the present disclosure, a single pose may be sent at render rate which is comparatively low, e.g., 60 Hz. This may reduce the system load, link load, and/or power without impacting the user experience. In some instances, a modem window may be opened for a service period and all data may be transmitted synchronously. This may allow a modem to sleep for a higher amount of time, as well as other subsystems, thus reducing the amount of power utilized. Regarding improving the user experience, display duplicates may be reduced as the decode out may occur at the ½ VSync time. Also, the ATW wait time may be reduced as the decode out is synchronized with the ½ VSync time.

Figure 19:
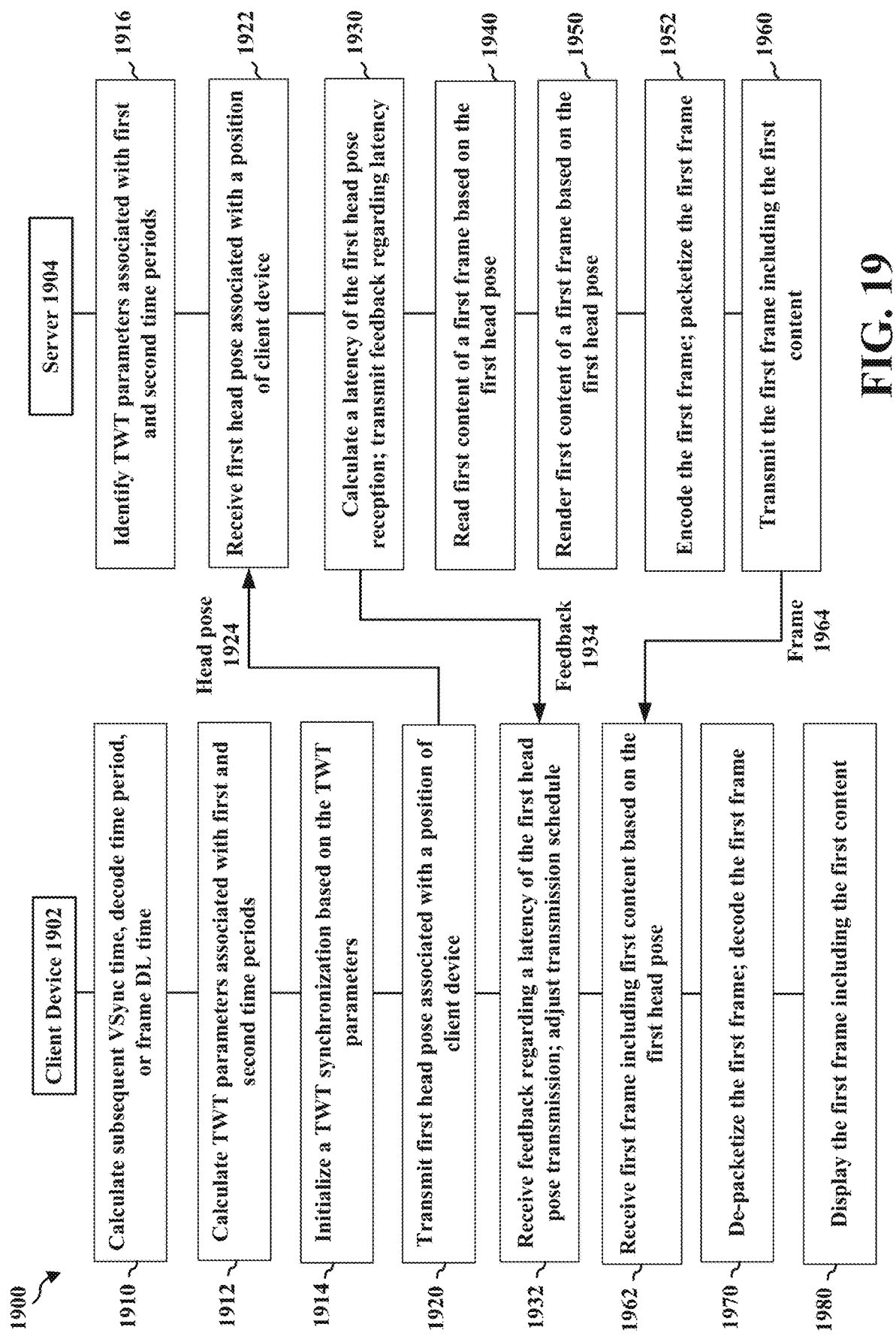
FIG. 19 is a communication flow diagram illustrating example communications between a client device and a server.

FIG. 19 is a communication flow diagram 1900 of graphics processing in accordance with one or more techniques of this disclosure. As shown in FIG. 19, diagram 1900 includes example communications between a client device 1902 and a server 1904, in accordance with one or more techniques of this disclosure. The client device 1902 and the server 1904 may be associated with a split rendering process. Also, each of the client device 1902 and a server 1904 may include a GPU and/or component associated with graphics processing.

At 1910, client device 1902 may calculate, prior to a calculation of the one or more target wake time (TWT) parameters, at least one of: a subsequent vertical synchronization (VSync) time, a decode time period, or a frame downlink (DL) time.

At 1912, client device 1902 may calculate one or more target wake time (TWT) parameters associated with a first time period and a second time period. The one or more TWT parameters may be calculated based on at least one of the subsequent VSync time, the decode time period, or the frame DL time.

At 1914, client device 1902 may initialize a TWT synchronization with a server based on the calculated one or more TWT parameters. The TWT synchronization with the server may align the transmission of the at least one first head pose with the beginning of the first time period. Also, the TWT synchronization with the server may align a first vertical synchronization (VSync) time with the first time period and a second VSync time with the second time period.

At 1916, server 1904 may identify one or more target wake time (TWT) parameters associated with a first time period and a second time period.

At 1920, client device 1902 may transmit, to a server at a beginning of a first time period, at least one first head pose associated with a position of the client device (e.g., head pose 1924), the first time period being synchronized with the server. The client device may be at least one of: a headset, a head mounted display (HMD), display glasses, or smart glasses, and the server may be at least one of: a phone, a smart phone, a computer, or a cloud server.

At 1922, server 1904 may receive, from a client device during a first time period, at least one first head pose associated with a position of the client device (e.g., head pose 1924), the first time period being synchronized with the client device.

At 1930, server 1904 may calculate a latency associated with the reception of the at least one first head pose. Also, at 1930, server 1904 may transmit, to the client device, feedback regarding the latency associated with the reception of the at least one first head pose (e.g., feedback 1934).

At 1932, client device 1902 may receive, from the server, feedback regarding a latency associated with the transmission of the at least one first head pose (e.g., feedback 1934). At 1932, client device 1902 may also adjust a transmission schedule of at least one subsequent head pose based on the received feedback.

At 1940, server 1904 may read, upon receiving the first head pose, the first content of the first frame based on the first head pose, where the first content is rendered based on the read first content.

At 1950, server 1904 may render, during the first time period, first content of at least one first frame based on the first head pose.

At 1952, server 1904 may encode, upon rendering the first content of the at least one first frame, the at least one first frame including the first content. At 1952, server 1904 may also packetize, upon encoding the at least one first frame, the at least one first frame including the first content, where the at least one first frame is encoded and packetized prior to the beginning of the second time period.

At 1960, server 1904 may transmit, to the client device at a beginning of a second time period, the at least one first frame including the first content (e.g., frame 1964), the second time period being synchronized with the client device.

At 1962, client device 1902 may receive, from the server during a second time period, at least one first frame including first content based on the at least one first head pose (e.g., frame 1964), the second time period being synchronized with the server. The first time period and the second time period may be target wake time (TWT) service periods. The first content of the at least one first frame may be associated with a left eye buffer and a right eye buffer of the client device, and the at least one first frame may include a left first frame for the left eye buffer and a right first frame for the right eye buffer. Also, the first content of the at least one first frame may be at least one of: extended reality (XR) content, augmented reality (AR) content, or virtual reality (VR) content.

At 1970, client device 1902 may de-packetize, upon receiving the at least one first frame, the at least one first frame including the first content. At 1970, client device 1902 may also decode, upon de-packetizing the at least one first frame, the at least one first frame including the first content, where the at least one first frame is de-packetized and decoded during the second time period.

At 1980, client device 1902 may display, upon receiving the at least one frame during the second time period, the at least one first frame including the first content.

Figure 20:
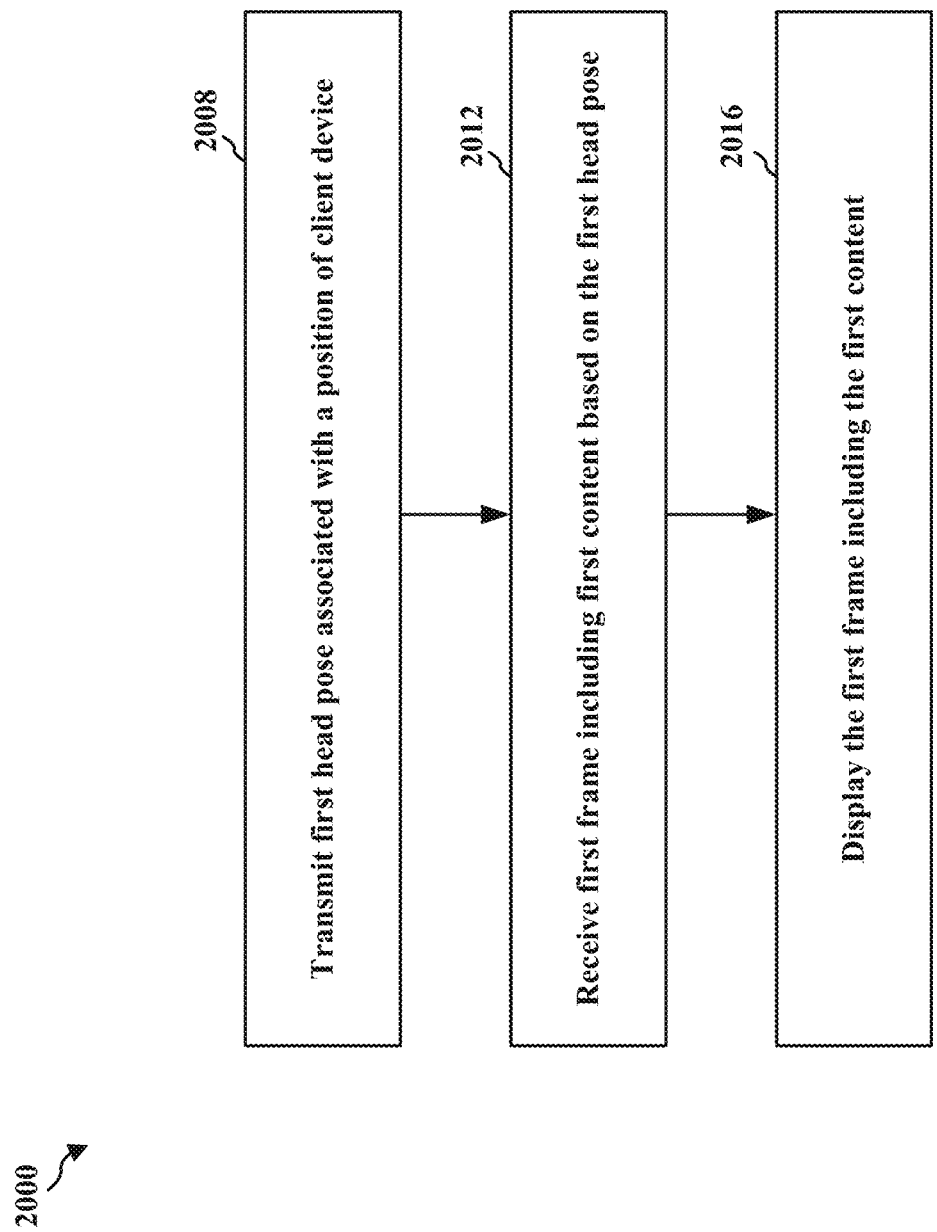
FIG. 20 is a flowchart of an example method of graphics processing.

FIG. 20 is a flowchart 2000 of an example method of graphics processing in accordance with one or more techniques of this disclosure. The method may be performed by a client device, which may be associated with an apparatus for graphics processing, a graphics processor, a wireless communication device, and/or any apparatus that may perform graphics processing as used in connection with the examples of FIGS. 1-19. The methods described herein may provide a number of benefits, such as improving resource utilization and/or power savings.

At 2008, the client device may transmit, to a server at a beginning of a first time period, at least one first head pose associated with a position of the client device, the first time period being synchronized with the server, as described in connection with the examples in FIGS. 1-19. For example, as described in 1920 of FIG. 19, client device 1902 may transmit, to a server at a beginning of a first time period, at least one first head pose associated with a position of the client device, the first time period being synchronized with the server. Further, step 2008 may be performed by processing unit 120 in FIG. 1. The client device may be at least one of: a headset, a head mounted display (HMD), display glasses, or smart glasses, and the server may be at least one of: a phone, a smart phone, a computer, or a cloud server.

At 2012, the client device may receive, from the server during a second time period, at least one first frame including first content based on the at least one first head pose, the second time period being synchronized with the server, as described in connection with the examples in FIGS. 1-19. For example, as described in 1962 of FIG. 19, client device 1902 may receive, from the server during a second time period, at least one first frame including first content based on the at least one first head pose, the second time period being synchronized with the server. Further, step 2012 may be performed by processing unit 120 in FIG. 1. The first time period and the second time period may be target wake time (TWT) service periods. The first content of the at least one first frame may be associated with a left eye buffer and a right eye buffer of the client device, and the at least one first frame may include a left first frame for the left eye buffer and a right first frame for the right eye buffer. Also, the first content of the at least one first frame may be at least one of: extended reality (XR) content, augmented reality (AR) content, or virtual reality (VR) content.

At 2016, the client device may display, upon receiving the at least one frame during the second time period, the at least one first frame including the first content, as described in connection with the examples in FIGS. 1-19. For example, as described in 1980 of FIG. 19, client device 1902 may display, upon receiving the at least one frame during the second time period, the at least one first frame including the first content. Further, step 2016 may be performed by processing unit 120 in FIG. 1.

Figure 21:
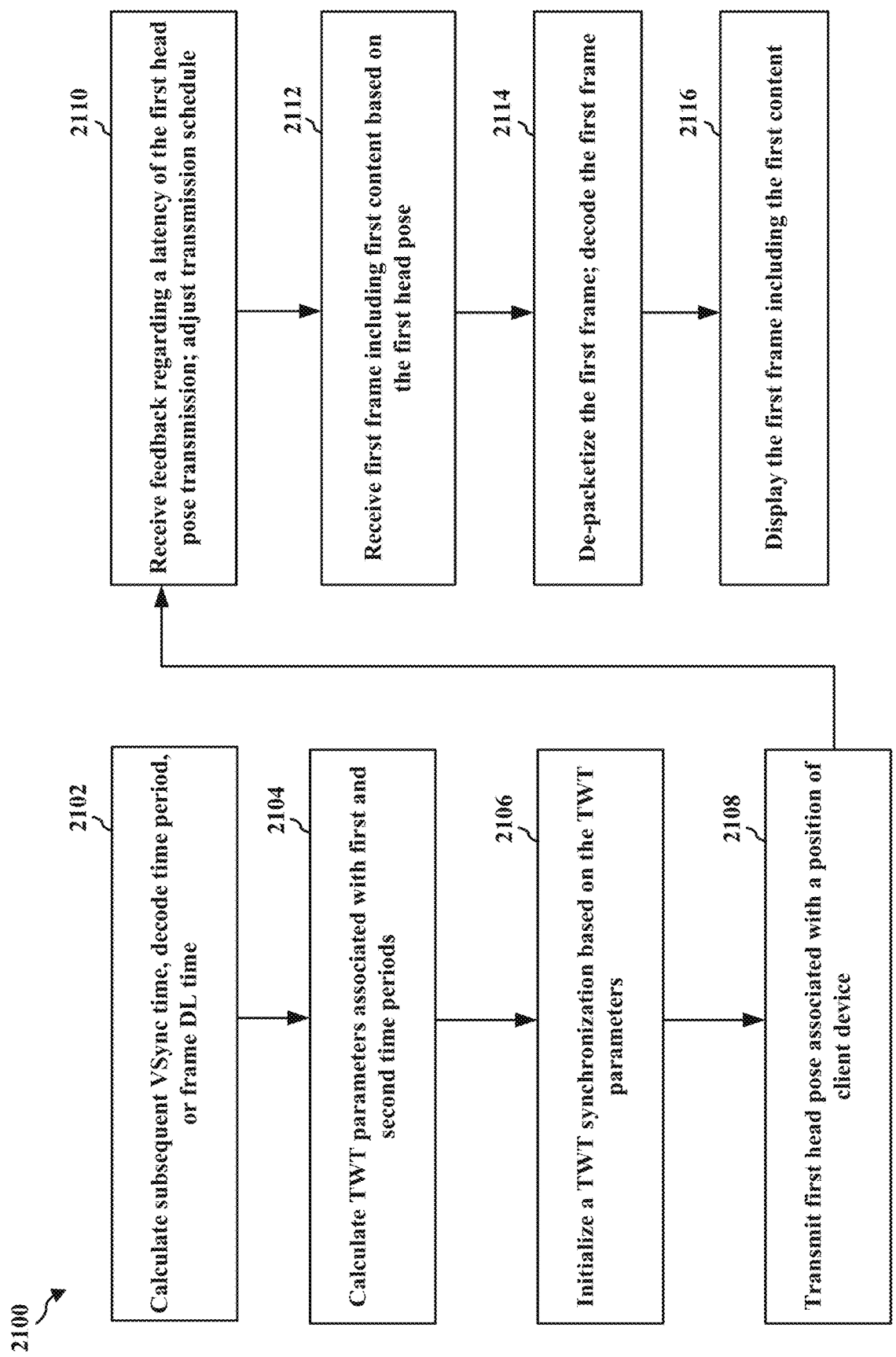
FIG. 21 is a flowchart of an example method of graphics processing.

FIG. 21 is a flowchart 2100 of an example method of graphics processing in accordance with one or more techniques of this disclosure. The method may be performed by a client device, which may be associated with an apparatus for graphics processing, a graphics processor, a wireless communication device, and/or any apparatus that may perform graphics processing as used in connection with the examples of FIGS. 1-19. The methods described herein may provide a number of benefits, such as improving resource utilization and/or power savings.

At 2102, the client device may calculate, prior to a calculation of the one or more target wake time (TWT) parameters, at least one of: a subsequent vertical synchronization (VSync) time, a decode time period, or a frame downlink (DL) time, as described in connection with the examples in FIGS. 1-19. For example, as described in 1910 of FIG. 19, client device 1902 may calculate, prior to a calculation of the one or more target wake time (TWT) parameters, at least one of: a subsequent vertical synchronization (VSync) time, a decode time period, or a frame downlink (DL) time. Further, step 2102 may be performed by processing unit 120 in FIG. 1.

At 2104, the client device may calculate one or more target wake time (TWT) parameters associated with a first time period and a second time period, as described in connection with the examples in FIGS. 1-19. For example, as described in 1912 of FIG. 19, client device 1902 may calculate one or more target wake time (TWT) parameters associated with a first time period and a second time period. Further, step 2104 may be performed by processing unit 120 in FIG. 1. The one or more TWT parameters may be calculated based on at least one of the subsequent VSync time, the decode time period, or the frame DL time.

At 2106, the client device may initialize a TWT synchronization with a server based on the calculated one or more TWT parameters, as described in connection with the examples in FIGS. 1-19. For example, as described in 1914 of FIG. 19, client device 1902 may initialize a TWT synchronization with a server based on the calculated one or more TWT parameters. Further, step 2106 may be performed by processing unit 120 in FIG. 1. The TWT synchronization with the server may align the transmission of the at least one first head pose with the beginning of the first time period. Also, the TWT synchronization with the server may align a first vertical synchronization (VSync) time with the first time period and a second VSync time with the second time period.

At 2108, the client device may transmit, to a server at a beginning of a first time period, at least one first head pose associated with a position of the client device, the first time period being synchronized with the server, as described in connection with the examples in FIGS. 1-19. For example, as described in 1920 of FIG. 19, client device 1902 may transmit, to a server at a beginning of a first time period, at least one first head pose associated with a position of the client device, the first time period being synchronized with the server. Further, step 2108 may be performed by processing unit 120 in FIG. 1. The client device may be at least one of: a headset, a head mounted display (HMD), display glasses, or smart glasses, and the server may be at least one of: a phone, a smart phone, a computer, or a cloud server.

At 2110, the client device may receive, from the server, feedback regarding a latency associated with the transmission of the at least one first head pose. At 2110, client device 1902 may also adjust a transmission schedule of at least one subsequent head pose based on the received feedback, as described in connection with the examples in FIGS. 1-19. For example, as described in 1932 of FIG. 19, client device 1902 may receive, from the server, feedback regarding a latency associated with the transmission of the at least one first head pose; and adjust a transmission schedule of at least one subsequent head pose based on the received feedback. Further, step 2110 may be performed by processing unit 120 in FIG. 1.

At 2112, the client device may receive, from the server during a second time period, at least one first frame including first content based on the at least one first head pose, the second time period being synchronized with the server, as described in connection with the examples in FIGS. 1-19. For example, as described in 1962 of FIG. 19, client device 1902 may receive, from the server during a second time period, at least one first frame including first content based on the at least one first head pose, the second time period being synchronized with the server. Further, step 2112 may be performed by processing unit 120 in FIG. 1. The first time period and the second time period may be target wake time (TWT) service periods. The first content of the at least one first frame may be associated with a left eye buffer and a right eye buffer of the client device, and the at least one first frame may include a left first frame for the left eye buffer and a right first frame for the right eye buffer. Also, the first content of the at least one first frame may be at least one of: extended reality (XR) content, augmented reality (AR) content, or virtual reality (VR) content.

At 2114, the client device may de-packetize, upon receiving the at least one first frame, the at least one first frame including the first content. At 2114, client device may also decode, upon de-packetizing the at least one first frame, the at least one first frame including the first content, where the at least one first frame is de-packetized and decoded during the second time period, as described in connection with the examples in FIGS. 1-19. For example, as described in 1970 of FIG. 19, client device 1902 may de-packetize, upon receiving the at least one first frame, the at least one first frame including the first content; and decode, upon de-packetizing the at least one first frame, the at least one first frame including the first content, where the at least one first frame is de-packetized and decoded during the second time period. Further, step 2114 may be performed by processing unit 120 in FIG. 1.

At 2116, the client device may display, upon receiving the at least one frame during the second time period, the at least one first frame including the first content, as described in connection with the examples in FIGS. 1-19. For example, as described in 1980 of FIG. 19, client device 1902 may display, upon receiving the at least one frame during the second time period, the at least one first frame including the first content. Further, step 2116 may be performed by processing unit 120 in FIG. 1.

Figure 22:
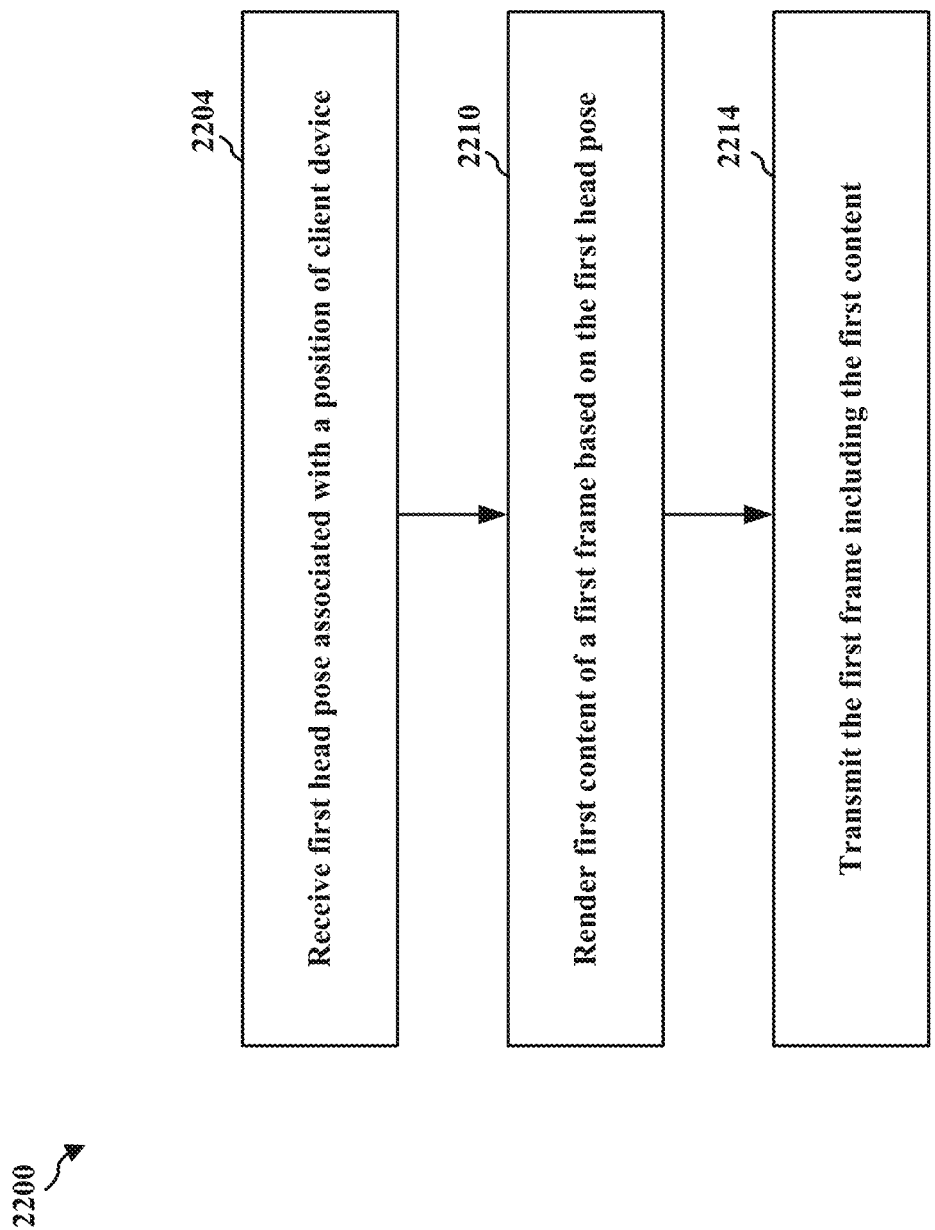
FIG. 22 is a flowchart of an example method of graphics processing.

FIG. 22 is a flowchart 2200 of an example method of graphics processing in accordance with one or more techniques of this disclosure. The method may be performed by a server, which may be associated with an apparatus for graphics processing, a graphics processor, a wireless communication device, and/or any apparatus that may perform graphics processing as used in connection with the examples of FIGS. 1-19. The methods described herein may provide a number of benefits, such as improving resource utilization and/or power savings.

At 2204, the server may receive, from a client device during a first time period, at least one first head pose associated with a position of the client device, the first time period being synchronized with the client device, as described in connection with the examples in FIGS. 1-19. For example, as described in 1922 of FIG. 19, server 1904 may receive, from a client device during a first time period, at least one first head pose associated with a position of the client device, the first time period being synchronized with the client device. Further, step 2204 may be performed by processing unit 120 in FIG. 1.

At 2210, the server may render, during the first time period, first content of at least one first frame based on the first head pose, as described in connection with the examples in FIGS. 1-19. For example, as described in 1950 of FIG. 19, server 1904 may render, during the first time period, first content of at least one first frame based on the first head pose. Further, step 2210 may be performed by processing unit 120 in FIG. 1.

At 2214, the server may transmit, to the client device at a beginning of a second time period, the at least one first frame including the first content, the second time period being synchronized with the client device, as described in connection with the examples in FIGS. 1-19. For example, as described in 1960 of FIG. 19, server 1904 may transmit, to the client device at a beginning of a second time period, the at least one first frame including the first content, the second time period being synchronized with the client device. Further, step 2214 may be performed by processing unit 120 in FIG. 1. The first time period and the second time period may be target wake time (TWT) service periods. The first content of the at least one first frame may be associated with a left eye buffer and a right eye buffer of the client device, and the at least one first frame may include a left first frame for the left eye buffer and a right first frame for the right eye buffer. Also, the first content of the at least one first frame may be at least one of: extended reality (XR) content, augmented reality (AR) content, or virtual reality (VR) content. Further, the server may be at least one of: a phone, a smart phone, a computer, or a cloud server, and the client device may be at least one of: a headset, a head mounted display (HMD), display glasses, or smart glasses.

FIG. 23 is a flowchart 2300 of an example method of graphics processing in accordance with one or more techniques of this disclosure. The method may be performed by a server, which may be associated with an apparatus for graphics processing, a graphics processor, a wireless communication device, and/or any apparatus that may perform graphics processing as used in connection with the examples of FIGS. 1-19. The methods described herein may provide a number of benefits, such as improving resource utilization and/or power savings.

At 2302, the server may identify one or more target wake time (TWT) parameters associated with a first time period and a second time period, as described in connection with the examples in FIGS. 1-19. For example, as described in 1916 of FIG. 19, server 1904 may identify one or more target wake time (TWT) parameters associated with a first time period and a second time period. Further, step 2302 may be performed by processing unit 120 in FIG. 1. A TWT synchronization with the client device may be initialized with the client device based on the one or more TWT parameters. The TWT synchronization with the server may align a transmission of the at least one first head pose with the beginning of the first time period. Also, the TWT synchronization with the server may align a first vertical synchronization (VSync) time with the first time period and a second VSync time with the second time period. The one or more TWT parameters may be identified based on at least one of: a subsequent vertical synchronization (VSync) time, a decode time period, or a frame downlink (DL) time.

At 2304, the server may receive, from a client device during a first time period, at least one first head pose associated with a position of the client device, the first time period being synchronized with the client device, as described in connection with the examples in FIGS. 1-19. For example, as described in 1922 of FIG. 19, server 1904 may receive, from a client device during a first time period, at least one first head pose associated with a position of the client device, the first time period being synchronized with the client device. Further, step 2304 may be performed by processing unit 120 in FIG. 1.

At 2306, the server may calculate a latency associated with the reception of the at least one first head pose. Also, at 2306, the server may transmit, to the client device, feedback regarding the latency associated with the reception of the at least one first head pose, as described in connection with the examples in FIGS. 1-19. For example, as described in 1930 of FIG. 19, server 1904 may calculate a latency associated with the reception of the at least one first head pose; and transmit, to the client device, feedback regarding the latency associated with the reception of the at least one first head pose. Further, step 2306 may be performed by processing unit 120 in FIG. 1.

At 2308, the server may read, upon receiving the first head pose, the first content of the first frame based on the first head pose, where the first content is rendered based on the read first content, as described in connection with the examples in FIGS. 1-19. For example, as described in 1940 of FIG. 19, server 1904 may read, upon receiving the first head pose, the first content of the first frame based on the first head pose, where the first content is rendered based on the read first content. Further, step 2308 may be performed by processing unit 120 in FIG. 1.

At 2310, the server may render, during the first time period, first content of at least one first frame based on the first head pose, as described in connection with the examples in FIGS. 1-19. For example, as described in 1950 of FIG. 19, server 1904 may render, during the first time period, first content of at least one first frame based on the first head pose. Further, step 2310 may be performed by processing unit 120 in FIG. 1.

At 2312, the server may encode, upon rendering the first content of the at least one first frame, the at least one first frame including the first content. At 2312, the server may also packetize, upon encoding the at least one first frame, the at least one first frame including the first content, where the at least one first frame is encoded and packetized prior to the beginning of the second time period, as described in connection with the examples in FIGS. 1-19. For example, as described in 1952 of FIG. 19, server 1904 may encode, upon rendering the first content of the at least one first frame, the at least one first frame including the first content; and packetize, upon encoding the at least one first frame, the at least one first frame including the first content, where the at least one first frame is encoded and packetized prior to the beginning of the second time period. Further, step 2312 may be performed by processing unit 120 in FIG. 1.

At 2314, the server may transmit, to the client device at a beginning of a second time period, the at least one first frame including the first content, the second time period being synchronized with the client device, as described in connection with the examples in FIGS. 1-19. For example, as described in 1960 of FIG. 19, server 1904 may transmit, to the client device at a beginning of a second time period, the at least one first frame including the first content, the second time period being synchronized with the client device. Further, step 2314 may be performed by processing unit 120 in FIG. 1. The first time period and the second time period may be target wake time (TWT) service periods. The first content of the at least one first frame may be associated with a left eye buffer and a right eye buffer of the client device, and the at least one first frame may include a left first frame for the left eye buffer and a right first frame for the right eye buffer. Also, the first content of the at least one first frame may be at least one of: extended reality (XR) content, augmented reality (AR) content, or virtual reality (VR) content. Further, the server may be at least one of: a phone, a smart phone, a computer, or a cloud server, and the client device may be at least one of: a headset, a head mounted display (HMD), display glasses, or smart glasses.

In configurations, a method or an apparatus for graphics processing is provided. The apparatus may be server or a client device, which may be associated with a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for transmitting, to a server at a beginning of a first time period, at least one first head pose associated with a position of the client device, the first time period being synchronized with the server; means for receiving, from the server during a second time period, at least one first frame including first content based on the at least one first head pose, the second time period being synchronized with the server; means for displaying, upon receiving the at least one frame during the second time period, the at least one first frame including the first content; means for calculating one or more target wake time (TWT) parameters associated with the first time period and the second time period; means for initializing a TWT synchronization with the server based on the calculated one or more TWT parameters; means for calculating, prior to the calculation of the one or more TWT parameters, at least one of: a subsequent vertical synchronization (VSync) time, a decode time period, or a frame downlink (DL) time; means for receiving, from the server, feedback regarding a latency associated with the transmission of the at least one first head pose; means for adjusting a transmission schedule of at least one subsequent head pose based on the received feedback; means for de-packetizing, upon receiving the at least one first frame, the at least one first frame including the first content; means for decoding, upon de-packetizing the at least one first frame, the at least one first frame including the first content, where the at least one first frame is de-packetized and decoded during the second time period; means for receiving, from a client device during a first time period, at least one first head pose associated with a position of the client device, the first time period being synchronized with the client device; means for rendering, during the first time period, first content of at least one first frame based on the first head pose; means for transmitting, to the client device at a beginning of a second time period, the at least one first frame including the first content, the second time period being synchronized with the client device; means for identifying one or more target wake time (TWT) parameters associated with the first time period and the second time period; means for calculating a latency associated with the reception of the at least one first head pose; means for transmitting, to the client device, feedback regarding the latency associated with the reception of the at least one first head pose; means for encoding, upon rendering the first content of the at least one first frame, the at least one first frame including the first content; means for packetizing, upon encoding the at least one first frame, the at least one first frame including the first content, where the at least one first frame is encoded and packetized prior to the beginning of the second time period; and means for reading, upon receiving the first head pose, the first content of the first frame based on the first head pose, where the first content is rendered based on the read first content.

The subject matter described herein may be implemented to realize one or more benefits or advantages. For instance, the described graphics processing techniques may be used by a server, a client device, a GPU, a graphics processor, or some other processor that may perform graphics processing to implement the synchronization techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize synchronization techniques in order to improve memory bandwidth efficiency and/or increase processing speed at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing at a client device including at least one processor coupled to a memory and configured to: transmit, to a server at a beginning of a first time period, at least one first head pose associated with a position of the client device, the first time period being synchronized with the server; receive, from the server during a second time period, at least one first frame including first content based on the at least one first head pose, the second time period being synchronized with the server; and display, upon receiving the at least one frame during the second time period, the at least one first frame including the first content.

Aspect 2 is the apparatus of aspect 1, where the at least one processor is further configured to: calculate one or more target wake time (TWT) parameters associated with the first time period and the second time period.

Aspect 3 is the apparatus of any of aspects 1 and 2, where the at least one processor is further configured to: initialize a TWT synchronization with the server based on the calculated one or more TWT parameters.

Aspect 4 is the apparatus of any of aspects 1 to 3, where the TWT synchronization with the server aligns the transmission of the at least one first head pose with the beginning of the first time period.

Aspect 5 is the apparatus of any of aspects 1 to 4, where the TWT synchronization with the server aligns a first vertical synchronization (VSync) time with the first time period and a second VSync time with the second time period.

Aspect 6 is the apparatus of any of aspects 1 to 5, where the at least one processor is further configured to: calculate, prior to the calculation of the one or more TWT parameters, at least one of: a subsequent vertical synchronization (VSync) time, a decode time period, or a frame downlink (DL) time.

Aspect 7 is the apparatus of any of aspects 1 to 6, where the one or more TWT parameters are calculated based on at least one of the subsequent VSync time, the decode time period, or the frame DL time.

Aspect 8 is the apparatus of any of aspects 1 to 7, where the at least one processor is further configured to: receive, from the server, feedback regarding a latency associated with the transmission of the at least one first head pose; and adjust a transmission schedule of at least one subsequent head pose based on the received feedback.

Aspect 9 is the apparatus of any of aspects 1 to 8, where the at least one processor is further configured to: de-packetize, upon receiving the at least one first frame, the at least one first frame including the first content.

Aspect 10 is the apparatus of any of aspects 1 to 9, where the at least one processor is further configured to: decode, upon de-packetizing the at least one first frame, the at least one first frame including the first content, where the at least one first frame is de-packetized and decoded during the second time period.

Aspect 11 is the apparatus of any of aspects 1 to 10, where the first time period and the second time period are target wake time (TWT) service periods.

Aspect 12 is the apparatus of any of aspects 1 to 11, where the first content of the at least one first frame is associated with a left eye buffer and a right eye buffer of the client device, and where the at least one first frame includes a left first frame for the left eye buffer and a right first frame for the right eye buffer.

Aspect 13 is the apparatus of any of aspects 1 to 12, where the first content of the at least one first frame is at least one of: extended reality (XR) content, augmented reality (AR) content, or virtual reality (VR) content.

Aspect 14 is the apparatus of any of aspects 1 to 13, where the client device is at least one of: a headset, a head mounted display (HMD), display glasses, or smart glasses, and where the server is at least one of: a phone, a smart phone, a computer, or a cloud server.

Aspect 15 is the apparatus of any of aspects 1 to 14, further including at least one of an antenna or a transceiver coupled to the at least one processor.

Aspect 16 is a method of graphics processing for implementing any of aspects 1 to 15.

Aspect 17 is an apparatus for graphics processing including means for implementing any of aspects 1 to 15.

Aspect 18 is a computer-readable medium storing computer executable code, the code when executed by at least one processor causes the at least one processor to implement any of aspects 1 to 15.

Aspect 19 is an apparatus for graphics processing at a server including at least one processor coupled to a memory and configured to: receive, from a client device during a first time period, at least one first head pose associated with a position of the client device, the first time period being synchronized with the client device; render, during the first time period, first content of at least one first frame based on the first head pose; and transmit, to the client device at a beginning of a second time period, the at least one first frame including the first content, the second time period being synchronized with the client device.

Aspect 20 is the apparatus of aspect 19, where the at least one processor is further configured to: identify one or more target wake time (TWT) parameters associated with the first time period and the second time period.

Aspect 21 is the apparatus of any of aspects 19 and 20, where a TWT synchronization with the client device is initialized with the client device based on the one or more TWT parameters.

Aspect 22 is the apparatus of any of aspects 19 to 21, where the TWT synchronization with the server aligns a transmission of the at least one first head pose with the beginning of the first time period.

Aspect 23 is the apparatus of any of aspects 19 to 22, where the TWT synchronization with the server aligns a first vertical synchronization (VSync) time with the first time period and a second VSync time with the second time period.

Aspect 24 is the apparatus of any of aspects 19 to 23, where the one or more TWT parameters are identified based on at least one of: a subsequent vertical synchronization (VSync) time, a decode time period, or a frame downlink (DL) time.

Aspect 25 is the apparatus of any of aspects 19 to 24, where the at least one processor is further configured to: calculating a latency associated with the reception of the at least one first head pose; and transmit, to the client device, feedback regarding the latency associated with the reception of the at least one first head pose.

Aspect 26 is the apparatus of any of aspects 19 to 25, where the at least one processor is further configured to: encode, upon rendering the first content of the at least one first frame, the at least one first frame including the first content.

Aspect 27 is the apparatus of any of aspects 19 to 26, where the at least one processor is further configured to: packetize, upon encoding the at least one first frame, the at least one first frame including the first content, where the at least one first frame is encoded and packetized prior to the beginning of the second time period.

Aspect 28 is the apparatus of any of aspects 19 to 27, where the at least one processor is further configured to: read, upon receiving the first head pose, the first content of the first frame based on the first head pose, where the first content is rendered based on the read first content.

Aspect 29 is the apparatus of any of aspects 19 to 28, where the first time period and the second time period are target wake time (TWT) service periods.

Aspect 30 is the apparatus of any of aspects 19 to 29, where the first content of the at least one first frame is associated with a left eye buffer and a right eye buffer of the client device, and where the at least one first frame includes a left first frame for the left eye buffer and a right first frame for the right eye buffer.

Aspect 31 is the apparatus of any of aspects 19 to 30, where the first content of the at least one first frame is at least one of: extended reality (XR) content, augmented reality (AR) content, or virtual reality (VR) content.

Aspect 32 is the apparatus of any of aspects 19 to 31, where the server is at least one of: a phone, a smart phone, a computer, or a cloud server, and where the client device is at least one of: a headset, a head mounted display (HMD), display glasses, or smart glasses.

Aspect 33 is the apparatus of any of aspects 19 to 32, further including at least one of an antenna or a transceiver coupled to the at least one processor.

Aspect 34 is a method of graphics processing for implementing any of aspects 19 to 33.

Aspect 35 is an apparatus for graphics processing including means for implementing any of aspects 19 to 33.

Aspect 36 is a computer-readable medium storing computer executable code, the code when executed by at least one processor causes the at least one processor to implement any of aspects 19 to 33.

What is claimed is:

1. An apparatus for graphics processing at a client device, comprising:
 a memory; and
 at least one processor coupled to the memory and configured to:
  transmit, to a server at a beginning of a first time period, at least one first head pose associated with a position of the client device, the first time period being synchronized with the server;
  receive, from the server during a second time period, at least one first frame including first content based on the at least one first head pose, the second time period being synchronized with the server; and
  display, upon receiving the at least one frame during the second time period, the at least one first frame including the first content, wherein the at least one processor is further configured to:
receive, from the server, feedback regarding a latency associated with the transmission of the at least one first head pose; and
adjust a transmission schedule of at least one subsequent head pose based on the received feedback.

2. The apparatus of claim 1, wherein the at least one processor is further configured to:
calculate one or more target wake time (TWT) parameters associated with the first time period and the second time period.

3. The apparatus of claim 2, wherein the at least one processor is further configured to:
initialize a TWT synchronization with the server based on the calculated one or more TWT parameters.

4. The apparatus of claim 3, wherein the TWT synchronization with the server aligns the transmission of the at least one first head pose with the beginning of the first time period.

5. The apparatus of claim 3, wherein the TWT synchronization with the server aligns a first vertical synchronization (VSync) time with the first time period and a second VSync time with the second time period.

6. The apparatus of claim 2, wherein the at least one processor is further configured to:
calculate, prior to the calculation of the one or more TWT parameters, at least one of: a subsequent vertical synchronization (VSync) time, a decode time period, or a frame downlink (DL) time.

7. The apparatus of claim 6, wherein the one or more TWT parameters are calculated based on at least one of the subsequent VSync time, the decode time period, or the frame DL time.

8. The apparatus of claim 1, wherein the at least one processor is further configured to:
de-packetize, upon receiving the at least one first frame, the at least one first frame including the first content.

9. The apparatus of claim 8, wherein the at least one processor is further configured to:
decode, upon de-packetizing the at least one first frame, the at least one first frame including the first content, wherein the at least one first frame is de-packetized and decoded during the second time period.

10. The apparatus of claim 1, wherein the first time period and the second time period are target wake time (TWT) service periods.

11. The apparatus of claim 1, wherein the first content of the at least one first frame is associated with a left eye buffer and a right eye buffer of the client device, and wherein the at least one first frame includes a left first frame for the left eye buffer and a right first frame for the right eye buffer.

12. The apparatus of claim 1, wherein the first content of the at least one first frame is at least one of: extended reality (XR) content, augmented reality (AR) content, or virtual reality (VR) content.

13. The apparatus of claim 1, further comprising at least one of an antenna or a transceiver coupled to the at least one processor, wherein the client device is at least one of: a headset, a head mounted display (HMD), display glasses, or smart glasses, and wherein the server is at least one of: a phone, a smart phone, a computer, or a cloud server.

14. An apparatus for graphics processing at a server, comprising:
a memory; and
at least one processor coupled to the memory and configured to:
receive, from a client device during a first time period, at least one first head pose associated with a position of the client device, the first time period being synchronized with the client device;
render, during the first time period, first content of at least one first frame based on the first head pose; and
transmit, to the client device at a beginning of a second time period, the at least one first frame including the first content, the second time period being synchronized with the client device,
wherein the at least one processor is further configured to:
calculate a latency associated with the reception of the at least one first head pose; and
transmit, to the client device, feedback regarding the latency associated with the reception of the at least one first head pose.

15. The apparatus of claim 14, wherein the at least one processor is further configured to:
identify one or more target wake time (TWT) parameters associated with the first time period and the second time period.

16. The apparatus of claim 15, wherein a TWT synchronization with the client device is initialized with the client device based on the one or more TWT parameters.

17. The apparatus of claim 16, wherein the TWT synchronization with the server aligns a transmission of the at least one first head pose with the beginning of the first time period.

18. The apparatus of claim 16, wherein the TWT synchronization with the server aligns a first vertical synchronization (VSync) time with the first time period and a second VSync time with the second time period.

19. The apparatus of claim 15, wherein the one or more TWT parameters are identified based on at least one of: a subsequent vertical synchronization (VSync) time, a decode time period, or a frame downlink (DL) time.

20. The apparatus of claim 14, wherein the at least one processor is further configured to:
encode, upon rendering the first content of the at least one first frame, the at least one first frame including the first content.

21. The apparatus of claim 20, wherein the at least one processor is further configured to:
packetize, upon encoding the at least one first frame, the at least one first frame including the first content, wherein the at least one first frame is encoded and packetized prior to the beginning of the second time period.

22. The apparatus of claim 14, wherein the at least one processor is further configured to:
read, upon receiving the first head pose, the first content of the first frame based on the first head pose, wherein the first content is rendered based on the read first content.

23. The apparatus of claim 14, wherein the first time period and the second time period are target wake time (TWT) service periods.

24. The apparatus of claim 14, wherein the first content of the at least one first frame is associated with a left eye buffer and a right eye buffer of the client device, and wherein the at least one first frame includes a left first frame for the left eye buffer and a right first frame for the right eye buffer.

25. The apparatus of claim 14, wherein the first content of the at least one first frame is at least one of: extended reality (XR) content, augmented reality (AR) content, or virtual reality (VR) content.

26. The apparatus of claim 14, further comprising at least one of an antenna or a transceiver coupled to the at least one processor, wherein the server is at least one of: a phone, a smart phone, a computer, or a cloud server, and wherein the client device is at least one of: a headset, a head mounted display (HMD), display glasses, or smart glasses.

27. A method of graphics processing at a client device, comprising:
- transmitting, to a server at a beginning of a first time period, at least one first head pose associated with a position of the client device, the first time period being synchronized with the server;
- receiving, from the server during a second time period, at least one first frame including first content based on the at least one first head pose, the second time period being synchronized with the server; and
- displaying, upon receiving the at least one frame during the second time period, the at least one first frame including the first content,
- wherein the method further comprises:
- receiving, from the server, feedback regarding a latency associated with the transmission of the at least one first head pose; and
- adjusting a transmission schedule of at least one subsequent head pose based on the received feedback.

28. A method of graphics processing at a server, comprising:
- receiving, from a client device during a first time period, at least one first head pose associated with a position of the client device, the first time period being synchronized with the client device;
- rendering, during the first time period, first content of at least one first frame based on the first head pose; and
- transmitting, to the client device at a beginning of a second time period, the at least one first frame including the first content, the second time period being synchronized with the client device
- wherein the method further comprises:
- calculating a latency associated with the reception of the at least one first head pose; and
- transmitting, to the client device, feedback regarding the latency associated with the reception of the at least one first head pose.

* * * * *